United States Patent [19]

Chelminski

[11] Patent Number: 4,712,202

[45] Date of Patent: Dec. 8, 1987

[54] METHOD AND APPARATUS FOR CONVERTING AN AIR GUN INTO A HYDRO GUN FOR MARINE SEISMIC IMPULSE GENERATION

[75] Inventor: Stephen V. Chelminski, West Redding, Conn.

[73] Assignee: Bolt Technolgy Corporation, Norwalk, Conn.

[21] Appl. No.: 680,733

[22] Filed: Dec. 12, 1984

Related U.S. Application Data

[63] Continuation-in-part of Ser. No. 579,389, Feb. 13, 1984, abandoned.

[51] Int. Cl.$^4$ .......................... G01V 1/14; G01V 1/38
[52] U.S. Cl. .................................. 367/144; 367/146; 181/118; 181/120
[58] Field of Search ............... 367/140, 141, 142, 143, 367/144, 145, 146; 181/117, 115, 116, 118, 119, 120; 124/57, 58, 59, 60, 61, 62, 71, 72, 73, 74, 75, 76

[56] References Cited

U.S. PATENT DOCUMENTS

| | | | |
|---|---|---|---|
| 3,249,177 | 5/1966 | Chelminski | 181/0.5 |
| 3,379,273 | 4/1968 | Chelminski | 367/144 |
| 3,704,855 | 12/1972 | Combe | 251/63.4 |
| 3,750,457 | 8/1973 | Pascouet | 73/12 |
| 3,789,866 | 2/1974 | Combe | 137/219 |
| 4,185,714 | 1/1980 | Pascouet | 181/120 |
| 4,234,052 | 11/1980 | Chelminski | 181/120 |
| 4,271,924 | 6/1981 | Chelminski | 367/144 X |
| 4,303,141 | 12/1981 | Pascouet | 181/120 |
| 4,594,697 | 6/1986 | Pascouet | 367/146 |

OTHER PUBLICATIONS

P. Newman, Oil & Gas Journal, Aug. 7, 1978, pp. 138, 140, 143, 144, 146 and 150.

(List continued on next page.)

*Primary Examiner*—Deborah L. Kyle
*Assistant Examiner*—Brian S. Steinberger
*Attorney, Agent, or Firm*—Parmelee, Bollinger & Bramblett

[57] ABSTRACT

A marine air gun is advantageously converted into a hydro gun by substitution of two clamp rings and by convenient addition of various parts, allowing normal air gun firing by triggering with usual solenoid valve. In a presently preferred embodiment, a novel firing chamber is also substituted, providing outwardly-facing piston rings and cylinder encircling this chamber. A special clamp is substituted for that which normally secures operating chamber to firing chamber. An outer-cylinder-defining housing is concentric around the firing chamber, with an annular piston sliding in the annular cylinder space defined intermediate the firing chamber and the new outer housing. This annular piston is propelled by the air blast, suddenly ejecting water slugs from ports in the new outer housing. Also added is a pressure-controlled air-vent valve, responsive to air pressure coupled through passages in an adapter mounted between solenoid valve and air gun. This vent, held closed by pressurized air during firing, afterwards vents to atmosphere. Advantageously it conserves firing-chamber air; it now enables ambient water pressure automatically to return the annular piston to initial position. By virtue that the air gun can be fired in usual manner and by virtue of automatic return of the annular piston after each firing, the usual firing and control systems and usual air compressors are used on shipboard, thereby creating large economies and time savings resulting from convenient conversion to hydro gun action or convenient conversion back to air gun action, whenever desired. In a modified embodiment of the invention, the air vent valve can be totally eliminated. The inertia of the water in an air vent line in communication with the upper end of the outer annular cylinder space has been found to be sufficient for momentarily preventing significant escape of pressurized air up into the air vent line during firing, thereby advantageously maintaining the desired high air pressure within the hydro gun structure during firing, without the need to provide a pressure-controlled air vent valve. The lower portion of the air vent line is preferably made of metal and may have exterior fins for readily conducting heat from the ambient water into the interior of the vent line for preventing internal ice build-up resulting from chilling due to rapid air expansion in the vent line near the exit from the upper end of the outer annular cylinder space.

49 Claims, 14 Drawing Figures

OTHER PUBLICATIONS

Seismic Systems Brochure, Hydropneumatic Water Guns, Pneumatic or Hydraulic, Houston, Tex., 1983.

Explovation Equipment Research, Inc., "New Airgun Imploder", Galveston, Tex., pp. 1-3, 5/85, *Marketing Brochure*.

Exploration Equipment Research, Inc., "Airgun Imploder", No stamped date, Marketing Brochure.

Bouyous et al., The Hydroshock Watergun Society of Exploration Geophysicists, Tech. Paper No. MA-3(V6), 1980, pp. 1-22.

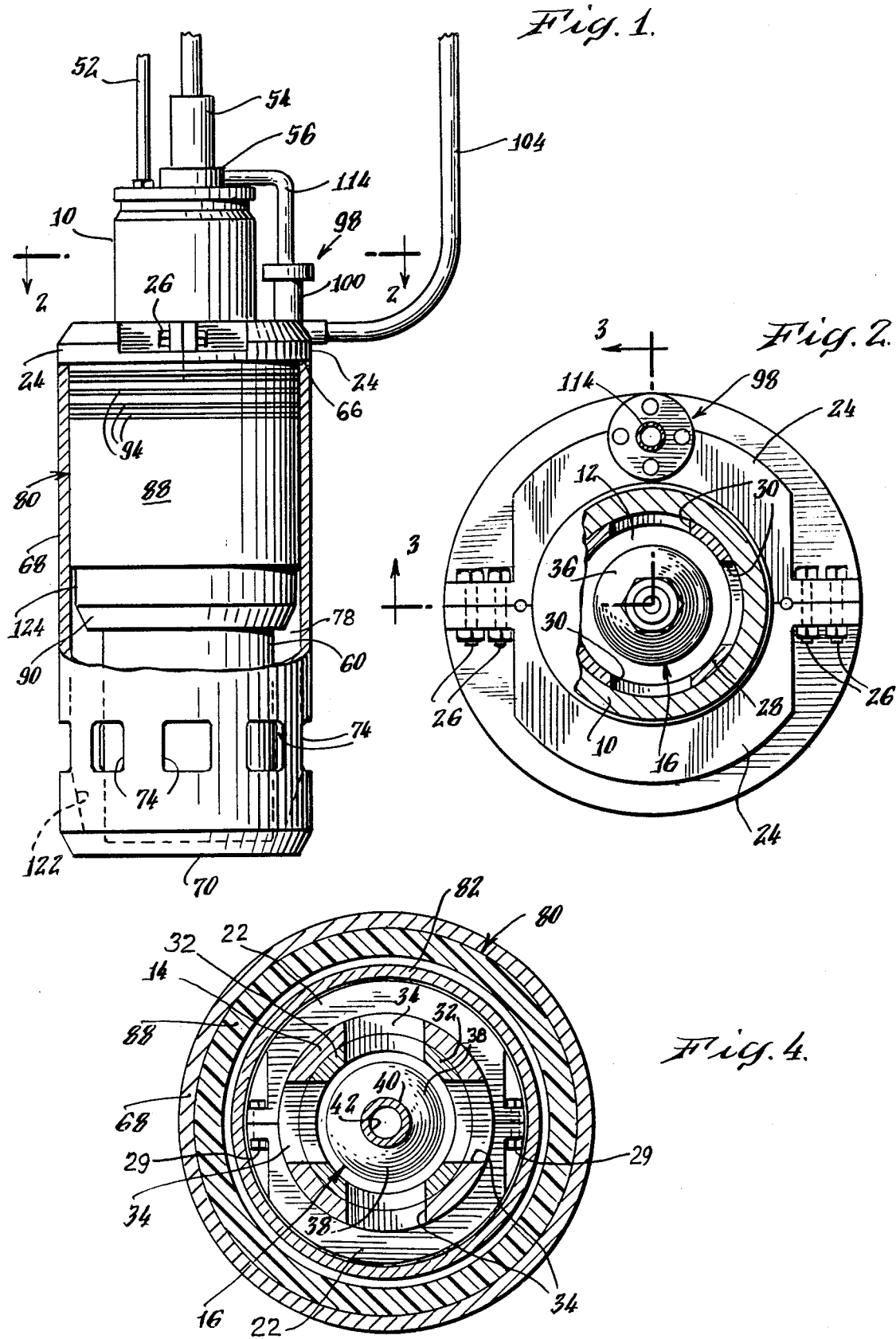

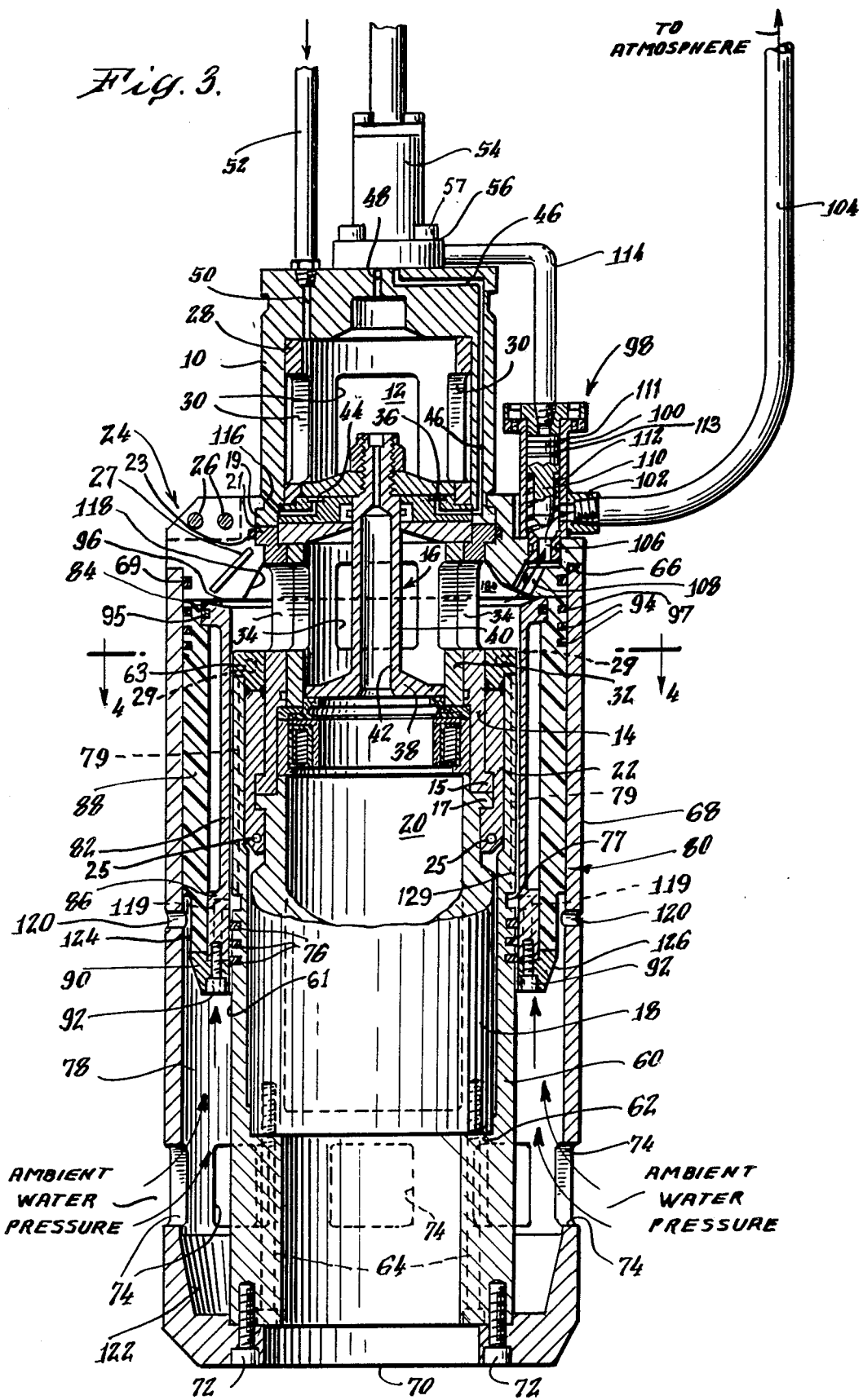

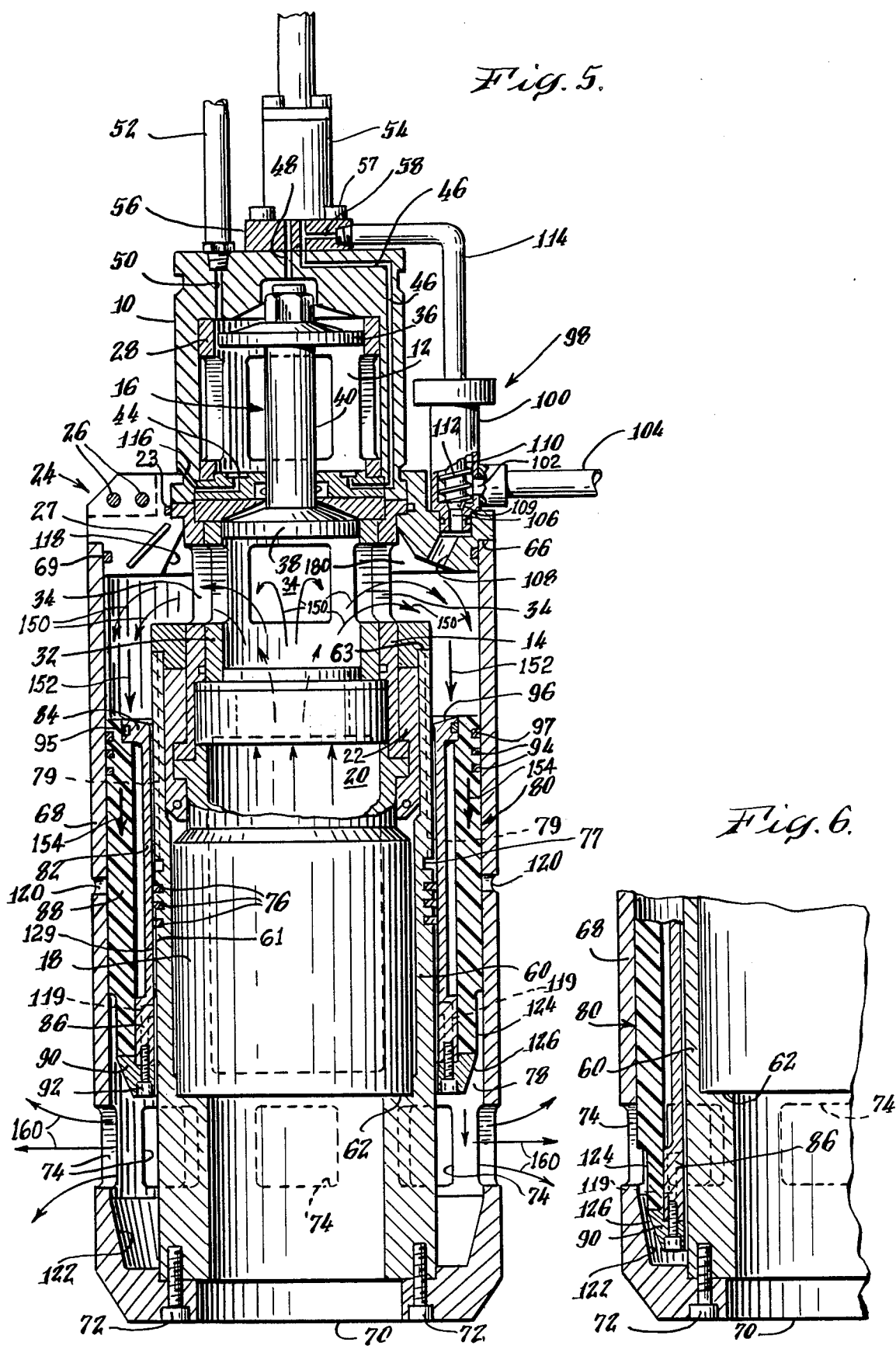

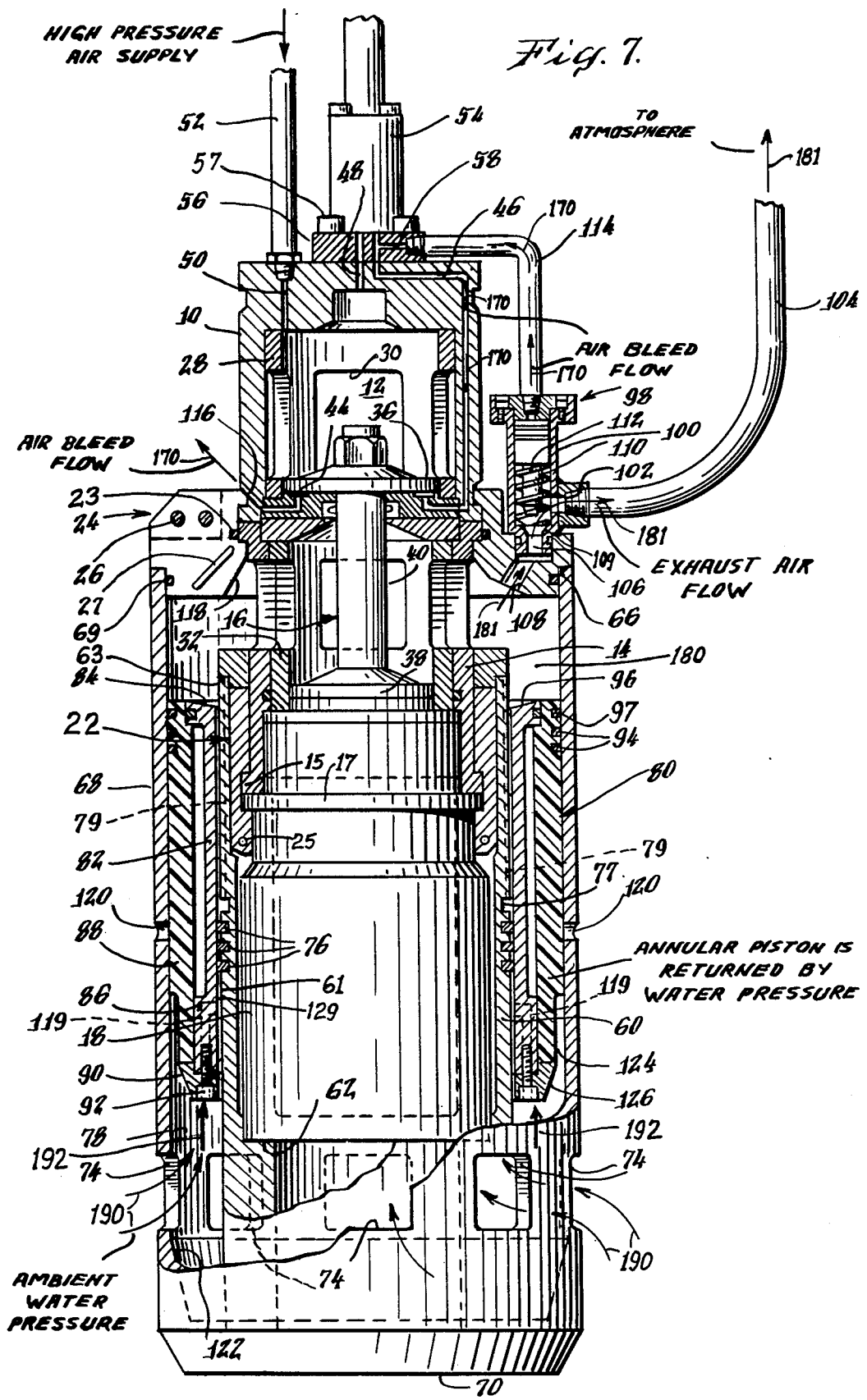

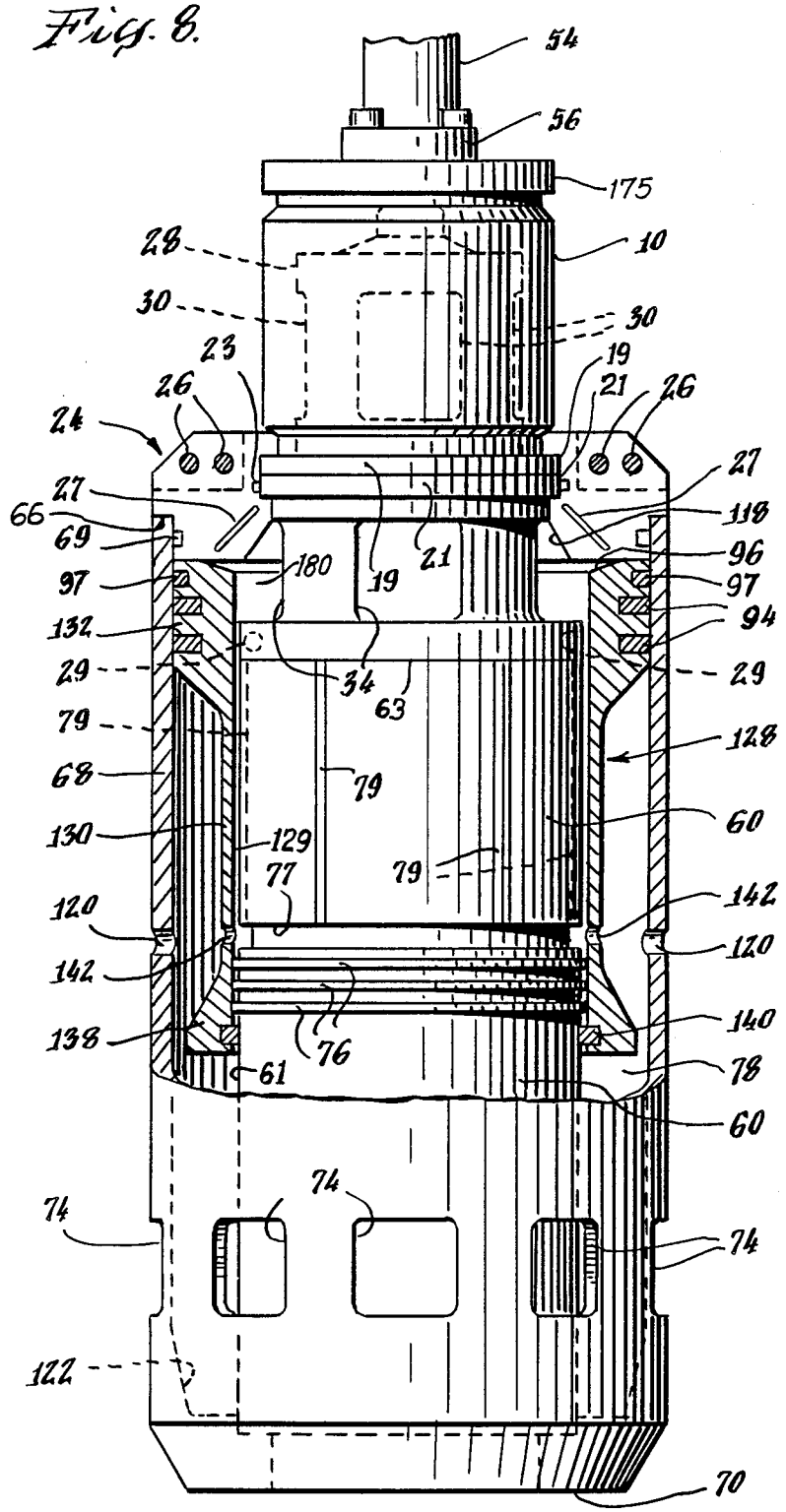

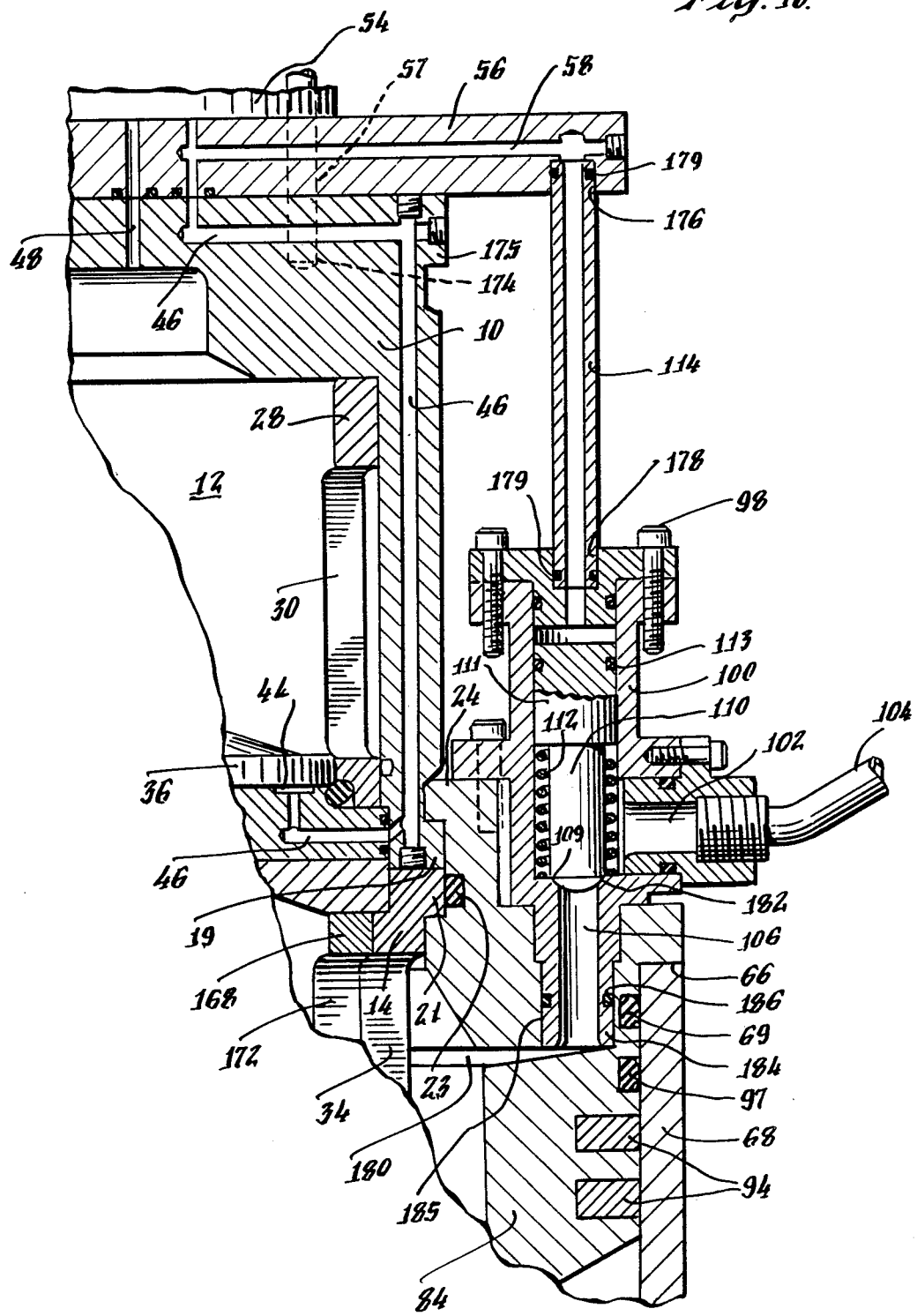

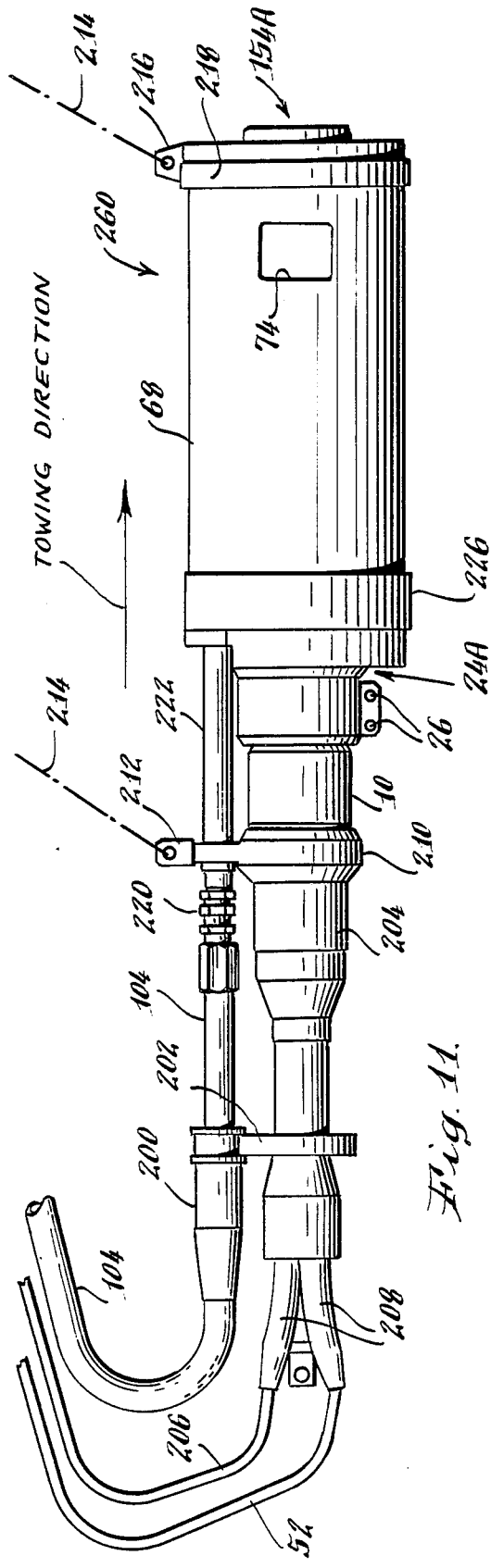
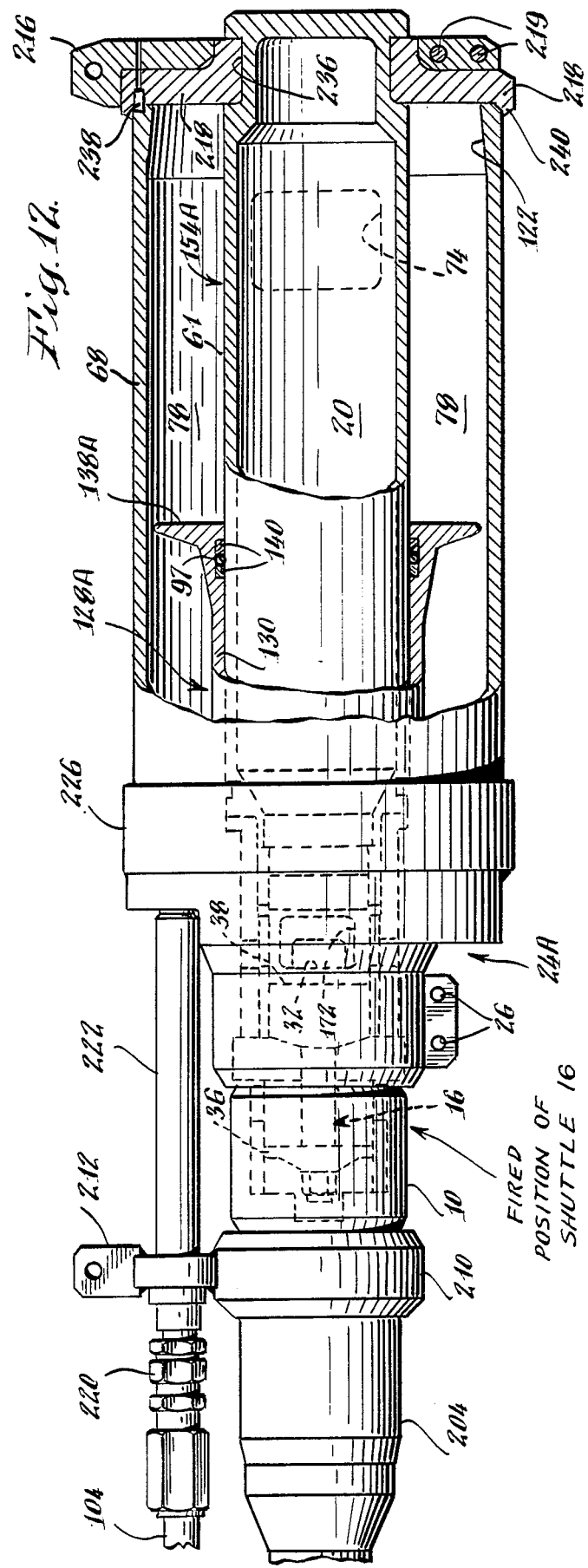

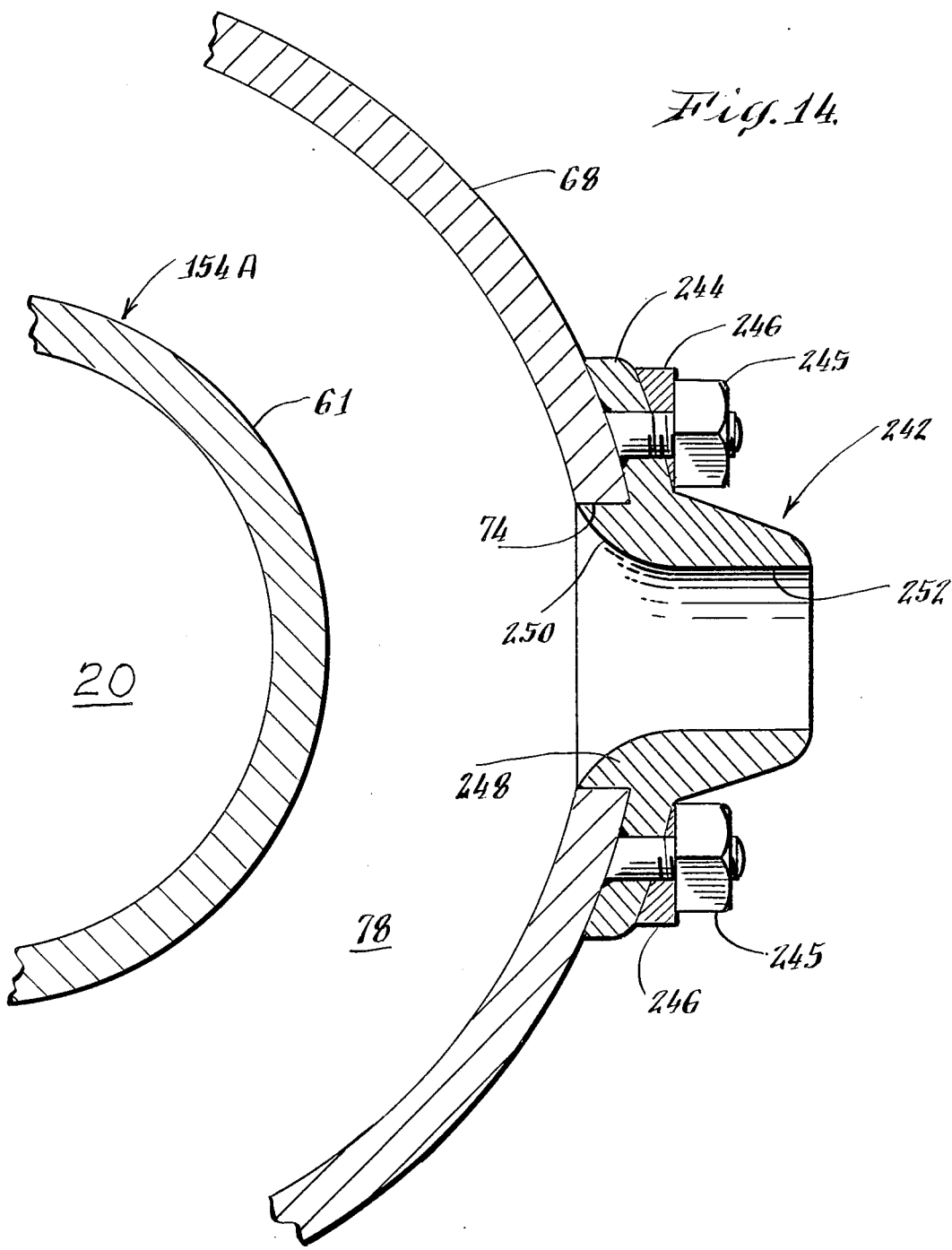

METHOD AND APPARATUS FOR CONVERTING AN AIR GUN INTO A HYDRO GUN FOR MARINE SEISMIC IMPULSE GENERATION

RELATED APPLICATION

This application is a continuation-in-part of my prior co-pending application Ser. No. 579,389, filed Feb. 13, 1984, now abandoned.

BACKGROUND OF THE INVENTION

This invention relates to marine seismic sources and, more particularly, to such sources in which a slug of liquid is propelled into surrounding water by an expanding volume of pressurized gas In seismic surveying in a body of water, air guns submerged in the water are a common means for generating seismic energy to investigate geological conditions and formations in the earth below or adjacent to the body of water. For this purpose, one or more such air guns are submerged in the water; compressed air, or other gas or gases under pressure, is fed to the submerged guns and temporarily stored therein. At the desired instant, the air guns (the seismic energy sources) are actuated, i.e., fired, and pressurized gas, usually highly compressed air, is abruptly released into the surrounding water. In this manner powerful acoustical waves are generated. These waves are capable of penetrating deeply into the subsurface material of the earth to be reflected and refracted therein by the various strata and formations. The reflected or refracted acoustical waves are sensed and recorded to provide information and data about the geological conditions and formations.

In order to avoid the generation of strong secondary impulses, such as can be created by the oscillating bubble of discharged air from an individual air gun, seismic energy sources known as "water guns" have recently been used. One such water gun is discussed in an article by P. Newman in the *Oil and Gas Journal*, Aug. 7, 1978, Pages 138-150. In that device, water is pushed from the gun by a piston propelled by expanding pressurized gas. After such a water gun is fired, the expanded pressurized gas is vented into the surrounding water over a relatively long period of time such that the discharged air does not generate any significant seismic signal which would interfere with the seismic signal generated by the water slug. The water gun is then reset, and it is recharged by refilling the gun with pressurized air.

Another type of water gun is described in U.S. Pat. No. 4,234,052 of the inventor herein. In the gun disclosed and claimed therein, pressurized gas is retained, and the gun is recharged by a high pressure water pump.

Insofar as their operation is concerned, the basic difference between air guns and water guns resides in the type of acoustic "signature" which each generates. The initial blast of an air gun is followed by an ascending bubble of air which periodically expands and contracts as it rises to the surface. This results in a rather complex "signature" distribution. The water gun, on the other hand, ejects a sudden slug of relatively incompressible water which generates a cavity which then implodes. This implosion results in a much briefer report with fewer and simpler waveforms. Accordingly, it will be understood that some investigators prefer water guns over air guns and may prefer one or the other for specific applications. It should also be understood that for marine seismic surveying, the air gun is most common, and these are found in great numbers. A single array may include, for example, 20 to 50 such guns towed by a survey vessel. It thus will be understood that the substitution of water guns with their attendant firing and control system for air guns on a ship could be expected to involve very large expenses and considerable delays and inconveniences, because an entirely new system is being substituted and installed on shipboard.

Accordingly, it is a primary object of the present invention to provide method and apparatus for converting an air gun to a hydro gun conveniently and reliably, while enabling the air gun to be fired normally by triggering with a solenoid valve in the usual manner and while providing for automatic returning of the water-ejecting piston to its initial position after each firing.

Advantageously, the conversion from air gun to hydro gun is convenient and is reversible from one to the other and then back again, if desired; so that a survey ship is enabled to convert quickly and easily back and forth between air gun action and hydro gun action. Tremendous economic savings and savings in time are achieved as compared with prior art water gun installations, by virtue of the fact that the usual firing and control systems are enabled to be retained on shipboard and by virtue of the fact that the existing expensive air compressor equipment is also retained.

Other objects, features, and advantages will become apparent from the following description and appended claims.

SUMMARY OF THE INVENTION

In accordance with the present invention, an air gun is converted to a hydro gun by means of an outer cylindrical housing which is concentric with, and is spaced from, the firing chamber of a conventional air gun. Within the space between the firing chamber and the exterior housing, there is provided an annular water piston. When the air gun is fired, the expanding air drives the annular water piston so as to eject slugs of water from ports provided in the outer housing. A relief valve, controlled by pressurized air coupled through an adapter block from the firing solenoid, is forcefully held closed during the firing of the air gun. After the slugs of water have been ejected, this relief valve automatically opens for venting the annular cylinder chamber to atmosphere. Consequently, ambient water pressure is enabled automatically to return the annular water piston to its initial position after each firing.

Since this relief valve (also called a "vent" valve) is automatically held closed by air pressure in a firing passage of the air gun, it cannot open until after the air gun shuttle has closed and re-sealed the firing chamber. Consequently, firing chamber air is thereby automatically and advantageously conserved.

In a modified embodiment of the invention, this vent valve may be totally eliminated from the structure of the hydro gun. The purpose of the vent valve is to prevent premature venting of pressurized air from the hydro gun structure through an air vent line during firing of the hydro gun. In this manner, the desired high air pressure within the hydro gun structure is advantageously maintained during the firing of the hydro gun. However, it has been found that the inertia of the water in the vent line is, by itself, sufficient momentarily to prevent any significant escape of pressurized air up into that vent line during the firing of the hydro gun. Accordingly, the presence of water in the vent line during firing is advantageously employed to avoid the need for the vent valve, consequently eliminating the cost and complexity of providing the hydro gun with such a vent valve system.

In order to prevent ice build-up within the lowest portion of the air vent line near the exit from the upper end of the annular cylinder space due to chilling resulting from sudden expansion of the escaping air, the lowest portion of this vent line is made of metal for readily conducting heat from the ambient water into the interior of the vent line. Fins may be provided on the exterior of this metal portion of the vent line for augmenting heat transfer from the ambient water.

If the operators of a ship desire to change over from air guns to water guns, the employment of this invention will result in considerable savings in time, money and in avoiding inconveniences, because the usual air gun firing and control system can still be used on shipboard even though water gun action is being achieved. The crew is enabled to use the familiar air gun firing and control systems on the ship.

Moreover, the existing expensive air compressor equipment is retained on shipboard for creating a very great economic savings and savings in time when an air gun survey ship is converted to hydro gun action.

In addition, the conversion from air gun action to hydro gun action is convenient and is reversible. The operators of a ship are provided with the capability of quickly and easily changing from air gun action to hydro gun action at any time the situation calls for a change, and then they can quickly and easily change back to air gun action again whenever a new situation dictates, because conversion in either direction is fully reversible.

BRIEF DESCRIPTION OF THE DRAWINGS

FIG. 1 is an elevational view of a hydro gun converted from an air gun in accordance with the present invention, the outer housing being partially broken away to illustrate its internal construction;

FIG. 2 is an enlarged cross-section taken substantially along the line 2—2 of FIG. 1;

FIG. 3 is a cross-section taken substantially along the line 3—3 of FIG. 2, with one-half of this section looking at right angles to the other half, for more fully and clearly illustrating the invention;

FIG. 4 is a cross-section taken substantially along the line 4—4 of FIG. 3;

FIG. 5 is a view similar to FIG. 3, illustrating the hydro gun during a portion of its firing stroke;

FIG. 6 is a partial cross-section illustrating the damping operation of the annular water-ejecting piston;

FIG. 7 is a view similar to that of FIGS. 3 and 5 showing the manner in which the water-ejecting piston is automatically returned to its initial position by utilizing ambient water pressure;

FIG. 8 is a partial cross-section showing a modified version of the annular water-ejecting piston and corresponding to a section taken straight across FIG. 2 from left to right, whereby the differential-area valve and the hose line to atmosphere, which are seen in FIGS. 3, 5 and 7, are not seen in FIG. 8;

FIG. 10 shows the modified adapter block mounted between the solenoid valve and the air gun, plus the vent valve;

FIG. 11 is a side elevation view of a modified embodiment of a hydro gun converted from an air gun in accordance with the present invention in which the vent valve has been eliminated;

FIG. 12 illustrates a portion of the embodiment of FIG. 11 in which the outer housing is partially broken away to illustrate internal components of the hydro gun, including a modified firing chamber for the air gun which is inside of the hydro gun;

FIG. 14 is a partial sectional view, showing a further modification of the hydro gun including removable, interchangeable water discharge nozzles which are associated with the water discharge ports.

DESCRIPTION OF THE PREFERRED EMBODIMENTS

Figure 9:
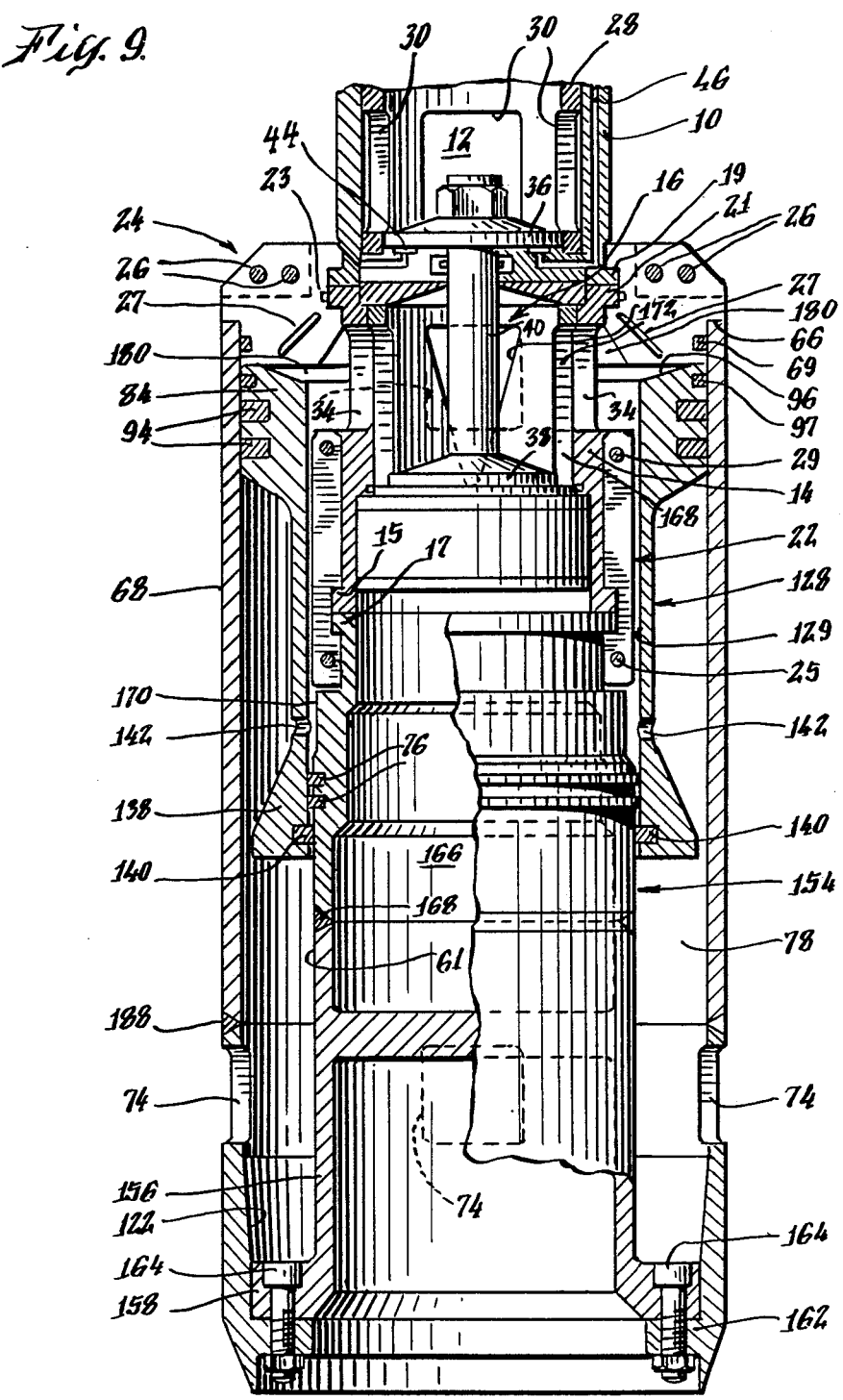
FIG. 9 is a partial cross-section taken as in FIG. 8 illustrating a modified lower housing and a novel air gun firing chamber which is substituted for the usual air gun firing chamber for forming an outwardly-facing cylinder wall with outwardly-facing stationary piston rings.

Although the term "air gun" is used in this specification, it is to be understood that these devices may operate with any compressed gas or mixture of gases including steam. Accordingly, the term "air" as employed herein is to be construed as including any such gases or mixture of gases.

With particular reference to FIGS. 1-3, there is illustrated a hydro gun in accordance with the present invention. At its core, is a relatively conventional air gun comprising an upper housing 10 containing an operating chamber 12, a central housing 14 (FIG. 3) which encloses shuttle 16, and a lower housing 18 which defines firing chamber 20. It is to be understood that the terms "upper" and "lower" as used herein are referenced to the drawings rather than to the actual operating position of the air gun. In actual use an air gun may be in any position and, in fact, when being towed through the ocean will be in a generally horizontal position.

The upper, central, and lower housings of the air gun are provided with flanges by which they are normally held together by clamp rings. In the illustrated embodiment, the abutting flanges 15, 17 of the central housing 14 and lower housing 18 are secured together by a novel clamp ring 22 which serves to mount an elongated bearing sleeve concentrically around the firing chamber as will be explained later. Moreover, the flanges 19, 21 of the upper housing 10 and the upper end of central housing 14 are secured by means of a clamp ring 24 of special design to be described. As illustrated in FIG. 2, the clamp ring 24 is in two semicircular parts secured together by bolts 26. The mating faces of the semicircular parts define matching linear grooves which enclose elastomeric sealing strips 27 oriented at about 45° to the hydro gun axis.

Summarizing the above paragraph, the usual two clamp rings of the air gun have been replaced by the novel clamping ring structures 22 and 24. It is to be noted that usually there is no sealing means between a clamp ring and an air gun. For aiding in directing downwardly the powerful air blast issuing from the discharge ports of the air gun, the special clamp ring 24 is sealed to the flange 21 by an O-ring 23 mounted in a groove in this clamp ring.

The internal construction of the air gun portion of this invention is essentially conventional. Thus, the upper housing 10 includes a liner 28 which defines the operating chamber 12 and includes two pairs of diametrically opposed recesses 30 in the sidewall. The central housing 14 also has an inner liner 32, and together they define four circumferentially spaced discharge ports 34. The shuttle 16 includes an upper piston 36 and a lower piston 38 interconnected by a central shaft 40 defining an air passage 42 therethrough. When shuttle 16 is in its lowermost position illustrated in FIG. 3, the upper piston 36 seats in the bottom of the operating chamber 12 and covers an annular groove 44. Groove 44 communicates with a firing passage 46 which extends through the sidewall of the upper housing 10 and out its upper surface where it exits closely adjacent another firing passage segment 48 which extends into operating chamber 12. Also connected to the operating chamber 12 through an air supply passage 50 is an air supply line 52 for supplying high pressure air.

In a conventional air gun, a solenoid valve 54 is mounted directly to the upper housing 10 and serves to selectively interconnect the firing passages 48, 46. In accordance with the present invention, however, there is interposed between upper housing 10 and solenoid valve 54 an adapter block 56. As will be apparent from the cross-section of FIG. 5, this adapter block creates an auxiliary passage 58 which connects with the firing passage 46.

Further modifications resulting in the conversion from an air gun to a hydro gun include the addition of elements to the lower housing 18. These include a bearing sleeve 60 which extends upwardly snugly fitting over the clamp ring 22 and seats against the bottom of housing 18 by an inwardly extending shoulder 62. This bearing sleeve 60 holds stationary piston rings 76, and the upper end of this bearing sleeve abuts against an annular shoulder 63 formed around the top of the clamp ring 22. The clamp ring 22 is in two generally semi-cylindrical halves secured together by pairs of lower and upper bolts 25 and 29. The bearing sleeve 60 is held in position by elongated machine screws 64 threaded into drilled and tapped openings in the bottom of lower housing 18. This lower housing 18 is often called the "firing chamber" because it contains the firing chamber 20. It is noted that the stationary piston rings 76 are outwardly-facing, and the bearing sleeve 60 defines an outwardly-facing cylinder wall surface 61.

Upper clamp ring 24 serves several functions in this invention. One of these is provided by the fact that it extends radially outwardly beyond the walls of the lower housing 18. It carries an annular recess 66 which receives the top edge of an exterior cylinder 68 (also called the "outer housing") which has an annular, lower end wall 70 which is secured to the bearing sleeve 60 by means of machine screws 72. This exterior cylinder 68 is sealed to the special clamp ring 24 by an O-ring seal 69 in a groove in ring 24. Near its bottom, the exterior cylinder 68 defines a plurality of circumferentially arranged water ports 74, for example eight ports angularly spaced 45° center-to-center. (The use of only four water ports has very recently shown unexpected advantages, as will be explained in connection with FIG. 9.) The outer surface of the bearing sleeve 60 is grooved to receive the stationary piston rings 76. Another groove 77 immediately above rings 76 serves as a water reentry manifold in cooperation with several spaced, parallel, vertical channels 79, to be explained later.

Slidably mounted against rings 76, and in the annular space 78 between sleeve 60 and cylinder 68 is a composite annular water piston 80. The annular piston 80 comprises an inner, relatively thin-walled metallic cylinder 82 having upper 84 and lower 86 thickened flanges extending radially outwardly to which is mounted a plastic (Delrin or Teflon) cylindrical piston member 88. The piston member 88 is secured to the piston cylinder 82 by means of a retainer ring 90 and cap screws 92. The upper end of piston member 88 carries piston rings 94, and an O-ring seal 95 is mounted in a groove in the thickened upper flange 84 for sealing the interior of the composite annular piston 80. It will be noted from FIG. 3, that the upper face 96 of the annular piston head 84 is beveled downwardly inwardly for reasons to be explained. There is a sliding O-ring seal 97 in addition to the piston rings 94.

Returning now to the upper clamp ring 24, it will be seen to carry a differential-area valve 98. Valve 98 includes a valve body 100 having one port 102 connected to an exhaust hose line 104, and a port 106 connected via a passage 108 to the head space immediately below the clamp ring. The upper end of this exhaust hose line 104 communicates with the atmosphere above the surface of the body of water in which the hydro gun is immersed, for example being supported by a float on the surface. Consequently, the passageway within this exhaust hose line 104 is always to atmospheric pressure. The valve body 100 contains a valve stem 110 which is biased upwardly into the valve-open position by means of spring 112. The upper end of valve stem 110 defines a piston 111 having a top with a larger area than the valve seating area at the lower end of this stem 110. An O-ring 113 encircles this piston in the manner of a piston ring. Thus, when the lower end of the valve stem 110 is seated, exposure of its two ends to equal pressures forcefully keeps the lower end of the stem seated for keeping the valve 98 closed. Valve 98 is controlled by an automatic control line 114 communicating between the piston head 111 of valve stem 110 and the auxiliary passage 58 in adapter block 56.

In addition to the structural details previously described, certain others also play roles in the effective functioning of the hydro gun of this invention as will be later explained. These include, for example, a small bleed vent 116 which connects the annular groove 44 in the bottom of the upper housing 10 to the ambient environment. Such a bleed vent is normally included in an air gun to prevent inadvertent firing in case pressurized air seeps into the annular groove 44. In this embodiment this bleed vent 116 is also used in a new and novel manner in conjunction with the operation of the differential-area valve 98. Another structural detail resides in the conical bevel 118 on the inner surface of the clamp ring 24, facing the air discharge ports 34. The lower flange 86 of cylinder 82 defines a plurality of radially disposed L-shaped water-reentry passages 119 which connect the groove 77 with the space 78 below water piston 80.

The purpose of water-reentry passages 119, groove 77 and channels 79 is to enable ambient water to flow upwardly (FIG. 3) after the annular piston 80 has been automatically pushed back up to its initial position by ambient water pressure. This upwardly flowing water reenters the head space 180 near the upper end of the annular piston 80, fills the air discharge ports 34 and enters the region in the central housing 14 of the air gun around the shuttle 16, thereby displacing air for filling with water all available volume associated with the head space 180 prior to the next firing of the air gun. The displaced air is vented from the head space 180 by passing up through passage 108 (FIG. 3) as shown by the arrows, venting through the valve 98 now being held open by the spring 112.

The exterior cylinder 68 includes air bleed ports 120 in its side for allowing escape of any air which may have become accumulated in the annular cylinder space 78 below the annular piston 80. The upwardly flowing water (FIG. 3) displaces any air out through the ports 120. As will be seen in FIG. 6, the lower end of exterior cylinder 68 defines an interior conical bevel 122 while the lower end of the water piston 80 includes a rabbet 124 at its lower end terminating in a truncated conical end 126. This rabbet 124 allows upwardly flowing water to displace air through ports 120.

In the modification of FIG. 8, most of the elements are identical to those described above and, accordingly, are given identical reference numerals. The exception is the water piston 128 which replaces water piston 80. Instead of being a composite of steel and plastic, piston 128 is a one-piece member. However, in order to achieve the desirable low mass and high strength and toughness, it is made of tough, strong metal, for example of titanium, and has a thin cylindrical wall 130. The upper end of wall 130 terminates in annular boss or thickened flange 132 which is grooved to carry a pair of piston rings 94 and an O-ring seal 97 which bear against the inner surface of cylinder 68. The lower end of annular piston wall 130 terminates at a flared skirt thickened flange 138 spaced a short distance from cylinder 68. The inner surface of skirt 138 is grooved to carry a bearing ring 140. Water reentry ports 142 around piston 128 are aligned with the groove 77 when the piston is in the illustrated initial raised position. Thus, water can flow up through the channels 79 for displacing air from the head space 180 being vented out through the differential area valve 98 in the same manner as explained in connection with FIG. 3.

The inner cylindrical surface 129 of water piston 80 or 128 is in sliding contact with the stationary piston rings 76. The bearing ring 140 of piston 128 is in sliding contact with the exterior cylindrical surface 61 of the bearing sleeve 60.

A further hydro gun is illustrated in FIG. 9, and this is my presently preferred embodiment for reasons as will be understood from the following discussion. The piston 128 is similar to that of FIG. 8. However, the lower housing 18 containing the firing chamber has been replaced with a firing chamber housing 154 characterized by a downwardly extended cylindrical skirt 156 carrying an external flange 158 at its lower end. Outer housing cylinder 68 is slightly modified to include an inner rim 162 which is attached to flange 158 by bolts 164. The firing chamber 166 defined by lower housing 154 is of a tiered, or "wedding cake", configuration to obtain the maximum volume consistent with sidewall strength and required clearances.

This firing chamber housing 154, which is substituted for the usual air gun firing chamber 18, advantageously provides additional features, namely, defining the outwardly-facing cylinder surface 61 and carrying the outwardly-facing stationary piston rings 76. By virtue of the fact that this novel firing chamber housing 154 provides these additional features, the bearing sleeve 60 (FIGS. 3, 5, 6, 7, 8) is omitted. This firing chamber housing 154 is formed in two pieces welded together as shown by the weld at 168.

When the annular water piston 128 is in its initial position, the water reentry ports 142 are aligned with a reduced outside diameter region 170 of the firing chamber housing 154 above the stationary rings 76 for accommodating upward flow of water past the novel clamp ring 22 for displacing air from the head space 180 near the upper end of the annular water piston, as was explained previously in connection with FIG. 3.

The novel clamp ring 22 extends upwardly so that its upper end is immediately adjacent to the lower edge of the air-discharge ports 34 for minimizing available volume in the head space 180 surrounding the air discharge ports. The purpose of minimizing available volume 180 is to minimize time needed to refill this volume with water by reentry flow (FIG. 3) prior to firing. Thus, the air 150, 152 discharged by firing of the air gun is confined by relatively incompressible media (solid material and water) for concentrating its expansion into propelling downwardly the annular water piston 80 or 128.

The outer housing cylinder 68 is also modified to include four water discharge ports 74 uniformly angularly spaced 90° center-to-center. Recent experiments have shown me that a lesser number than eight uniformly spaced water ports produces a more powerful seismic signal. My present theory for explaining this result is that the eight ports 74 are angularly spaced apart only 45°. Therefore the ejected slugs of water are too close together, causing confusion, turbulence and interference in their desired cavitation implosions. On the other hand, four ports appears to be optimum, because they produce relatively larger slugs of water spaced apart 90°. Each of the four slugs is thereby surrounded with sufficient clearance for the surrounding ambient water to create a powerful cavitation implosion. Experiments have also shown me that two diametrically opposed ports 74 are too few in number for optimum results to be obtained.

Another major distinction of the FIG. 9 modification resides in the modified liner 168 of central housing 14. This liner defines triangular air discharge ports 172 which overlie the rectangular discharge ports 34 of housing 14. Ports 172 are positioned with their apexes downward and very near the bottom of the lower piston 38 of shuttle 16 when the shuttle is in its initial closed position.

FIG. 10 is an enlarged partial sectional view showing the differential-area valve 98 and the adapter block 56 in the air-to-hydro gun conversion method and system illustrated in FIG. 9. The adapter block 56 is sandwiched between the base of the solenoid valve 54 and the top end of the upper housing 10 of the air gun. The solenoid valve 54 is secured to the upper housing 10 by suitable mounting means, for example including cap screws 57 passing through holes in the adapter block and screwed into threaded sockets 174 in the upper housing 10. The upper housing 10 of the air gun includes the usual convenient mountirg flange 175.

In order to connect the branch passage 58 in the adapter block 54 with the automatic control line 114 leading to the differential area valve 98, the adapter block is extended out beyond the side wall of the air gun upper housing 10. A socket 176 in the overhanging portion of this adapter block receives the upper end of a strong tube 114 whose lower end is captured in an aligned socket 178 in the top of the valve 98. O-rings 179 seal the captured tube ends in sockets 176, 178.

The valve stem 110 of the valve 98 is shown in FIG. 10 in its closed position. It is noted that the spring 112 encircles the shank of the valve stem 110 and presses upwardly on the lower surface of the enlarged piston head 111. A rounded truncated cone 182 at the bottom of the valve stem 110 forms the valve surface and closes against the corresponding truncated conical valve seat 109 concentric with the passage 106 in the valve body 100.

In order to mount the lower end of the valve body 100, it has a boss 184 received in a socket 185 in the special clamp ring 24 and sealed with an O-ring 186. This mounting socket 185 extends down to the head space 180 (FIG. 9) near the annular piston head 84 of the annular water-ejecting piston 128. Thus, the passage 106 in the boss 184 communicates directly with the head space 180, and there is no need for the diagonal passage 108 shown in FIGS. 3, 5 and 7.

It will be understood that all components are preferably fabricated of corrosion resistant material; for example most components are made of high strength and tough stainless steel. Those components which are in sliding contact are made of bearing material, for example such as bronze or Delrin. The various seals are formed of tough, durable, solid resilient material, for example polyurethane. The outer housing cylinder 68 in FIG. 9 is preferably made in two parts welded together at 188.

OPERATION

A relatively conventional marine air gun is converted to a hydro gun by replacing the upper clamp holding upper housing 10 to central housing 14 with the specialized clamp ring 24 carrying the differential-area valve 98. The clamp ring normally connecting central housing 14 to lower housing 18 is replaced by the novel clamp ring 22, and there are additionally added to the structure the bearing sleeve 60 carrying stationary piston rings, the water piston 80 or 128, and the exterior cylinder 68. The adapter block 56 is mounted between solenoid valve 54 and the upper housing 10 of the air gun. The line 114 is connected between the adapter block 56 and the differential-area valve 98, and the exhaust line 104 is connected from the valve 98 to the surface atmosphere. In the preferred hydro gun conversion method as shown in FIG. 9, the usual air gun firing chamber 18 is replaced by the novel firing chamber 154.

The operation of the hydro gun of this invention may now be understood by particular reference to FIGS. 3-7. Referring first to FIG. 3, the gun is illustrated in its initial position, it being understood that the gun is to be considered as submerged in a body of water with the exhaust line 104 extending to the surface.

Pressurized air or other gas (e.g. 500–6000 psi) is supplied through the air supply line 52 and the air supply passage 50 into the operating chamber 12, the shuttle 16 being in its lowermost position with upper piston 36 seated in the bottom of the operating chamber 12. The pressurized air fills the chamber 12 and passes downwardly through the air passage 42 in the shank of the shuttle 16 to fill the firing chamber 20. As the area of the upper piston 36 is greater than that of the lower piston 38, which is exposed to pressurized air in the firing chamber 20, the shuttle 16 remains in the illustrated initial closed position. During this charging period and also after the firing chamber 20 is charged to full pressure, the differential-area valve 98 remains open under the influence of its spring 112. The solenoid valve 54 remains closed so that there is no communication between the operating chamber 12 and either the firing passage 46 or the automatic control passage and line 58, 114.

When it is desired to fire the gun, an electrical trigger signal is sent to solenoid valve 54 in the same fashion as in firing a conventional air gun. In a conventional air gun, this triggering of the solenoid valve results in interconnection of firing passage segment 48 with firing passage 46. In the hydro gun conversion, the presence of adapter block 56 results in the auxiliary passage 58, which leads to the line 114 and to the top of differential area valve 98, also being interconnected with passage 48. Accordingly, during triggering of the air gun there automatically occurs the application of high pressure to the top of the valve 98 for forcing the valve stem 110 shut against the force of spring 112. Simultaneously, pressurized air enters the firing passage 46 and then into the annular groove 44 underlying the upper piston 36. This begins to equalize the pressure on the two sides of upper piston 36, thereby permitting the pressure in the firing chamber 20 to force the shuttle 16 upwardly. As the edges of the upper piston 36 pass the lower edges of recesses 30, any remaining pressure difference tending to slow the upward motion of the upper piston is rapidly reduced, and the shuttle 16 is slammed upward at a very rapid velocity. The FIG. 9 modification operates in the same manner. However, since the lower ends of the triangular outlet ports 172 begin to be uncovered almost as soon as the shuttle 16 begins to lift, the air discharge blast begins sooner and more gradually, for reasons as explained below.

Turning now to FIG. 5, it will be noted that the shuttle 16 is shown in its upward (air-gun-fired) position with the lower piston 38 clear of the discharge ports 34. This open shuttle position permits the compressed air or other gas 150 to blast rapidly through the outlet ports 34. Sealing strips 27 prevent its escape between the semicircular parts of clamping ring 24. Also, the seals 23 and 69 prevent escape of the highly pressurized gas 150 as it is blasting powerfully out through the four air gun discharge ports 34, as shown by the arrows 150. The presence of the bevel 118 on the inner surface of clamp ring 24 directs the air 150 downwardly as shown by the arrows 152, and the beveled face 96 at the upper end of the composite annular water-ejecting piston 80 receives the expanding air and assists in starting the water piston 80 downward. As previously explained, the water piston 80 is a composite piston, with its inner portion being metal but relatively thin, while its outer member 88 is of a plastic such as Delrin or Teflon so that it has relatively little mass. This modest mass reduces the inertia of the piston 80 permitting it to accelerate and decelerate relatively easily and avoiding unduly high stresses during damping at the end of its stroke. FIG. 5 shows this water-ejecting piston 80 approximately half-way down along its downward stroke 154. As it travels downward, it displaces the mass of water which originally filled annular cylinder space 78 and ejects water forcefully as a plurality of slugs 160 issuing through the respective water ports 74, for example eight, six or four water slugs 160, thereby generating the desired seismic impulse in the surrounding water.

In order to prevent the water piston 80 from forcibly slamming into the bottom of the assembly, there is provided, as shown in FIG. 6, a hydraulic damping action. The water ports 74 are spaced above the lower end wall 70 so as to leave a "pool" of water in the resulting space. Damping results from the interaction of the bevel 122 in exterior cylinder 68 with the conical taper 126 on the piston. As these tapers are unequal, the continued downward travel of the water piston 80 into the "pool" results in water being ejected through a continuously narrowing channel and outwardly through continuously decreasing outlet openings defined by the rabbet 124 and ports 74. (Interaction between bevels 122 and skirts 138 of pistons 128 of FIGS. 8 and 9 serve a similar hydraulic damping purpose.)

The final automatic sequences in the operating cycle of the invention will now be illustrated by reference to FIG. 7. The air gun has completed its firing, and its shuttle 16 has returned back down to its initial closed and sealed position. Since the triggering pulse has ceased, the solenoid valve 54 has closed, thereby breaking communication between the operating chamber 12 and both the differential area valve 98 and the firing passage 46. However, communication between the valve 98 and the firing passage 46 advantageously remains open as a result of the passages within adapter block 56. Accordingly, the spring 112 opens the valve 98 after entrapped air bleeds away from the top of the valve 98, as shown by the arrows 170, through line 114 and passage 58 and firing passage 46, around the annular groove 44, and out the bleed vent 116. Thus, this bleed vent is being used for a novel purpose, namely, to allow pressurized air to escape 170 from the top of the valve 98 for enabling its spring 112 to automatically open this valve. It will be understood that the bleed vent 116 remains open at all times. However, because of its small size it has no appreciable affect on the operation of the air gun during its firing cycle.

The differential area valve 98, now being open, connects the volume 180 in the annular cylinder above the water piston 80 to atmosphere. Consequently, the discharged air from the air gun, which was entrapped within the cylinder volume 180, is now automatically enabled to begin escaping as shown by the exhaust flow arrows 181. This exhaust flow proceeds through passage 108 in the clamp ring 24 and through the bottom port 106 of the valve 98, past the valve seat 109 and out through the outlet port 102 and up through the hose line 104 to atmosphere. As a result of this exhaust flow, the pressure within the cylinder volume 180 above the water piston 80 rapidly decreases toward atmospheric pressure. This decrease in pressure in the volume 180 advantageously enables the ambient water pressure 190, which is greater than atmospheric pressure, automatically to push the annular water piston 80 back up to its initial fully raised position. There is no need for a complex control system on shipboard for causing the annular water piston to return to its initial position. The ambient water pressure 190 causes entering water flow through ports 74, acting against the lower end of piston 80 to force it upwardly and into its initial position as is illustrated by the arrows 192 in FIG. 7. Any residual entrapped air in the volume 180 above the piston 80 which is remaining there as the piston nears its topmost position is displaced by the upwardly flowing water (FIG. 3) and is allowed to escape through the open vent valve 98. The upwardly flowing water enters through the channels 79 from the annular groove 77, coming up through the L-shaped passages 119 from the space 78 below the piston. Any entrapped air within space 78 escapes through ports 120. These ports 120 are located in a position where the moving piston rings 94 will not move past the ports when the piston 80 travels down 154 (FIG. 5) to its lowest position (FIG. 6.). ports 120 in FIG. 8 are also located where the piston rings 134 will not pass the ports.

A number of important features are present in this invention. For example, the clamp ring 24, which replaces the conventional air gun clamp ring has been recessed at the bolt area as shown particularly in FIG. 2. This keeps the heads and nuts of the bolts 26 from protruding. Accordingly, the bolts present no impediment to the handling of the gun along the deck of a ship. Clamp 24 performs several functions. One of these is that the beveled surface 118 serves as a deflector for the air blast 150 from discharge ports 34. Secondly, the clamp ring 24 serves to mount the differential-area valve 98 to the water gun. Third, the same clamp 24 serves as the cylinder head for the annular water cylinder. It is the stop against which the water piston abuts at the top of its return stroke. Thus, the new clamp ring 24 serves at least four functions in addition to holding the parts of the gun together.

By using the elongated machine screws 64, there is attached the relatively long bearing sleeve 60 which enables the annular water chamber to be longer than the firing chamber 20. This extra length is desirable because I have discovered, when operating with compressed air in the range of 2,000 to 2,300 p.s.i., that it is most advantageous for the volume of water to be displaced to be about equal to the volume of the firing chamber 20. (In other words, the volume of water to be displaced from the annular cylinder space 78 is approximately equal to the intial volume of the charge of pressurized gas in the firing chamber 20.) The modified firing chamber 166 of the preferred FIG. 9 hydro gun conversion method and apparatus approximately matches the discharged water volume.

It will be noted that the bottom of the outer cylinder 68 is open within the annular end wall 70 thus helping to reduce the overall weight of the hydro gun. In FIG. 9 the need for elongated screws 64 is obviated, and they are replaced by bolts 164 for securing the outer cylinder housing 68 to the novel firing chamber housing 154.

As previously explained, both the composite water piston 80 and one-piece piston 128 make use of relatively thin inner cylindrical walls which are able to take the shock of the expanding air but, at the same time, are of reduced mass to decrease inertia. In order to achieve this result, the piston rings 76, rather than being on the moving piston, are instead retained in grooves on the stationary bearing sleeve 60 or are carried in grooves on the novel firing chamber housing 154 (FIG. 9).

As previously pointed out, it is believed that the optimum condition is for the annular water chamber to have about as much volume as the firing chamber 20 or 166. Air pressure is used to drive the annular piston to eject water and it is desirable for the water piston to travel as fast as possible. There appears to be an optimum compromise, when the volume of water to be displaced (expelled) is about equal to the volume of the firing chamber, thereby expanding the discharged gas 150, 152 until its pressure above the annular piston head 84 has dropped into the range of three-fifths to two-fifths (preferably about one-half) of its initial value, which appears to maximize the water piston propulsive thrust. This optimum relationship seems to create the most rapid and effective water slug ejection and thereby the most abrupt and powerful cavitation at the end of the water stroke, such abrupt powerful cavitation being desired.

In the FIG. 9 modification, the need for the elongated machine screws 64 (FIG. 3) is avoided by replacing the original lower housing 18 with the elongated lower firing chamber housing 154 which serves as the bearing cylinder 61 for the lower bearing 140 of water piston 128 and also serves to hold the stationary piston rings 76.

The triangular outlet ports 172 in modified liner 168 within the central air gun housing 14 permit the high pressure air from firing chamber 166 to escape with an initial crescendo, rather than with a sudden transition from fully-closed to fully-open discharge ports 34. This initial crescendo air blast tends to reduce somewhat the initial upward acceleration of the shuttle 16 and tends to change the initial downward force on piston 128 from an abrupt shock to a progressively increasing powerful push, thus reducing physical stress and improving propulsion efficiency.

The sudden, explosive-like release of air from an air gun directly into the water is desirable when using an air gun for generating seismic energy in the water. However, my experiements have shown that in the case of a hydro gun such a sudden shuttle motion, with sudden transition from fully-closed to fully-open air discharge ports 34, causes pre-curser spurts of water to issue through the ports 74, before the annular water piston 80 or 128 has significantly moved. Such precurser spurts may undesirably confuse the overall seismic energy "signature" produced in the water. By providing downwardly extending tapered discharge ports 172 in the liner, for example triangular ports of relatively long isosceles triangular configuration as shown in FIG. 9, located inside of the usual rectangular discharge ports 34 in the central housing 14, the pressurized air begins to be released almost as soon as the shuttle 16 begins to accelerate upwardly. Thus, the air blasting through the ports 34 initiates with a smooth, powerful, crescendo-like increase, while the shuttle is accelerating upwardly. Precurser water spurt effects are substantially eliminated for maximizing the desired, powerful, abrupt signal produced by cavitation following ejection of the water slugs.

The top edges of the isosceles triangular liner ports 172 are shown aligned with the top edges of the rectangular discharge ports 34.

Advantageously, this invention contemplates the use of interchangeable central housing sleeves 168 having various shapes of outlet ports 172 for modifying the release rate of the expanding pressurized air for modifying the propulsion of the annular water piston for varying water-slug ejection, as may be desired for producing differing seismic energy "signatures" by the hydro gun under different seismic survey conditions.

The differential-area vent valve 98 is proportioned so that it will remain closed until after (a) the air gun has discharged, and (b) the water-ejecting piston 80 or 128 has travelled down its full stroke length, and (c) the shuttle 16 has returned to its initial closed position. By virtue of the fact that this vent valve 98 is controlled by the pressure of the air in control line 144 connected with the firing passage 46, it now will be explained how and why this vent valve is automatically prevented from opening until the shuttle has returned and resealed the firing chamber, as specified at (c) above. It is seen from FIG. 5 that, as long as the shuttle is away from its initial position, the firing passage 46 remains in direct communication with the operating chamber 12, because the annular groove 44 is fully exposed to this operating chamber. Hence, the pressure in the firing passage 46(and thus in the control line 114) remains comparable with the pressure in the operating chamber 12, regardless of whether the solenoid valve 54 remains open or closed.

Therefore, it is only after the shuttle has returned to its initial closed position (as shown in FIG. 7) that the pressure in the control line 114 can bleed down as indicated by the arrows 170. Then, only after this bleed down has occurred to a significant extent can the differential-area vent valve open.

Consequently, the discharged and expanded air 150, 152 is confined (by preventing its venting) until after full travel of the water piston has been produced and the firing chamber has been closed by the shuttle. Therefore, air pressure in the firing chamber is conserved. For example, when the volume of expelled water equals the firing chamber volume, then the discharged air 150, 152 expands to twice its volume. The immediate post-firing pressure in the firing chamber 20 or 166 is 50% of the pre-firing pressure. No further pressure drop can occur, because the discharged air is remaining confined by the closed vent valve. The seals 23, 27, 69, 97 and piston rings 76, 94 cooperate to confine and conserve this firing-chamber air.

It is to be understood that the annular water piston 80 or 128 is intended to be guided near its upper and lower ends by suitable sliding bearing means. For example, in the composite water piston 80 (FIGS. 1, 3, 5, 6 and 7) the slippery rigid plastic member 88 serves as a bearing, and it slides along the inner cylindrical surface of the outer housing cylinder 68. Thus, this member 88 serves as sliding bearing means for guiding both the upper and lower ends of the water piston 80.

In the air-to-hydro gun conversion method and apparatus shown in FIGS. 8 and 9, the lower end of the annular water piston 128 is guided by the bearing ring 140 sliding along the cylindrical exterior surface 61 of the bearing sleeve 60 (FIG. 8) or of the substitute firing chamber 154 (FIG. 9). At the upper end of the water piston 128 one of the piston rings 94 (preferably the lower one) is a bearing ring sliding along the interior cylindrical surface of the outer housing cylinder 68, thereby guiding the upper end of the piston 128.

The vent hose 104 has been described as extending up above the surface of the water into communication with the atmosphere. It will be understood that the purpose of this hose line 104 is to place the outlet port 102 of the vent valve 98 into communication with a region of significantly lower pressure than the ambient water pressure 190 (FIG. 7) in the immediate vicinity of the water ports 74. The resultant differential in pressure enables the ambient pressure 190 to enter the water ports 74 to push the water piston 80 or 128 back, as shown by the arrows 192, for returning it automatically to its initial position. This pressure differential also enables the reentry of water into the head space 180 for displacing the expanded discharged air as shown by the arrows 181 (FIG. 7).

The atmospheric pressure at sea level is approximately 15 p.s.i., and the pressure in ocean water increases approximately one p.s.i. for each two feet of increasing depth. Thus, when the hydro gun is at a depth of 30 feet in the ocean, the ambient water pressure 190 is 30 p.s.i.; namely, a differential of 15 p.s.i. above atmospheric pressure.

In cases where the hydro gun is at a greater depth than 30 feet so that the ambient pressure 190 is greater, or in cases where a lesser differential pressure will suffice to enable automatic piston return and to enable venting of air from the head space and re-filling with water, then the vent hose need not extend all of the way up to the atmosphere. It need only extend to a region of sufficiently reduced pressure relative to ambient pressure 190 in order to produce the desired results.

In most instances, it is my preference to obtain as large a differential in pressure between ambient pressure 190 and the region of reduced pressure as is practicable, without taking heroic steps, because the larger this differential in pressure, the quicker will be the automatic return of the water piston and the displacement 181 of the expanded discharged air, and thus the quicker the hydro gun will be ready for the next firing of the air gun.

Accordingly, the term "a region of reduced pressure relative to the pressure of the ambient water" and similar terms are intended to be interpreted sufficiently broadly to include operative alternatives for achieving the desired results.

FURTHER EMBODIMENTS OF THE INVENTION

Figure 13:
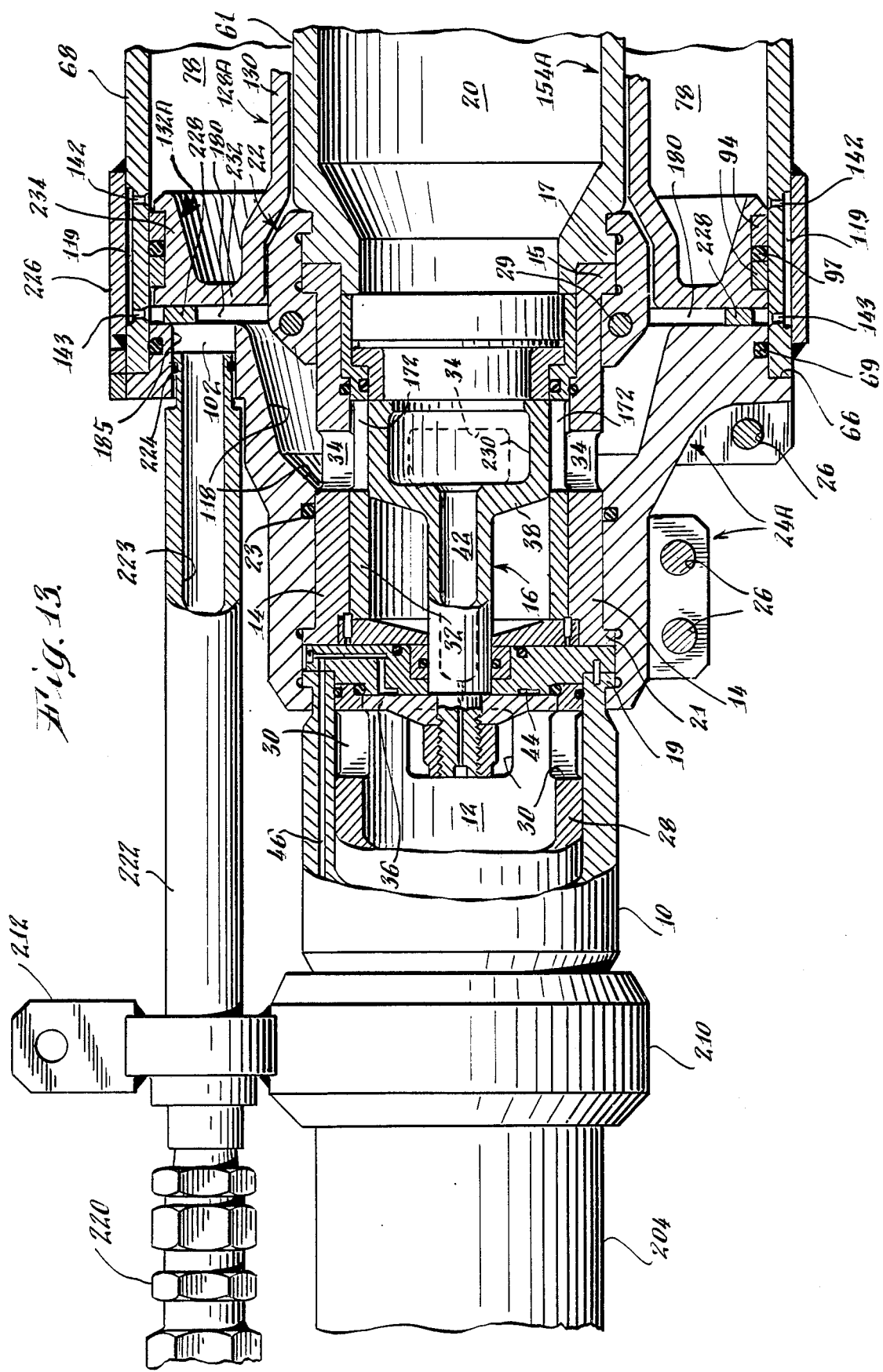
FIG. 13 is an enlarged section of a portion of the hydro gun and of the air gun therein, as illustrated in FIG. 12.

FIGS. 11-13 illustrate a modified embodiment of the present invention. Parts and components of this modified embodiment are designated by the same reference numerals used to designate the corresponding parts and elements of the embodiments illustrated by FIGS. 1-10.

As discussed fully earlier herein, the embodiments of FIGS. 1-10 include a differential-area vent valve 98 coupled between the head space 180 of the outer annular cylinder and the bottom of the air vent line 104 communicating with atmospheric pressure. The hydro gun embodiments previously described in connection with FIGS. 1-10 include a system, for example, such as shown most clearly in FIG. 10, for assuring that this vent valve 98 remains in a closed position during firing to advantageously retain the desired high pressure air within the upper portion 180 of the cylinder space 78 above the water piston 80 or 128 during firing.

After firing (FIG. 5), the vent valve automatically opens (FIG. 7) to permit the venting of air to atmosphere and the consequent entry of water (FIG. 7) through the ports 78 for returning the annular water piston 80 or 128 to its pre-firing initial position.

A basic difference between the hydro gun of the earlier discussed embodiments and the embodiment illustrated in FIGS. 11-13 is that the vent valve 98 and the associated means for controlling the position of this valve have been totally eliminated. In the embodiment of FIGS. 11-13, the lower end of the air vent line 104 communicates directly with the upper portion 180 of the annular cylinder space 78, which accommodates the annular water piston 80 or 128 and which is filled with water prior to firing.

Prior to the firing of the hydro gun, the vent line 104 has become completely filled with water as shown by the ambient water flow arrows 190, 181 in FIG. 7. This water flow 190, 181 fills the length of the vent line 104 up to the level of the surface of the body of water in which the hydro gun is submerged, or up to the top of the vent line, if it does not happen to extend all of the way up to the surface. Thus, there is a significant length of water in this vent line which constitutes a significant mass, for example, approximately 30 feet long, or more.

As shown in FIG. 11, the vent hose 104 passes through a resilient flexible tapered sleeve 200 for minimizing vibration and stress. This sleeve 200 is secured by a bracket 202 to an elongated protective rigid housing 204 mounted on the rear (left) end of the air gun portion of the hydro gun. This protective housing 204 surrounds and protects the solenoid valve 54 (FIGS. 1, 3, 5, 7 and 8) and protects the electrical cable 206 connected to the solenoid valve and the high pressure air supply hose line 52. Resilient flexible sleeves 208 extending into the housing 204 serve to protect the cable 206 and supply line 52. The elongated protective housing 204 is secured by a mounting clamp ring 210 to a mounting flange 175 (FIGS. 8 and 10) on the upper housing 10. This clamp 210 may have a towing pad eye 212 secured to it. Towing cables or chains 214 are attached to this pad eye 212 and to another pad eye 216 on a mounting clamp ring 218 fastened by bolts 219 and located on the front (right) end of the hydro gun.

The vent hose line 204 is connected by fittings at 220 to one end of a length of metal pipe 222 whose other end is received in the socket 185 (please see also FIG. 10) in the special clamp ring 24A. The pipe 222 is sealed to the socket 185 by an o-ring 224 in a groove encircling the end portion of the pipe.

The socket 185 defines a vent port 102 communicating directly with the head space 180 above the one-piece water piston 128A. This water piston 128A is modified and improved as compared with the water piston 128 shown in FIGS. 8 and 9, as will be explained later. The pipe 222 forms the lower portion of the vent line 104. The purpose of the metal pipe section 222 is to provide good thermal conductivity for conducting heat energy from the ambient water into the bore 223 of this pipe section 222 for preventing ice build-up in the bore. The rapid expansion of the moisture-laden air exiting from the upper end 180 of the annular water cylinder space 78 causes expansion chilling which tends to cause moisture to condense and freeze in the lowest portion of the vent line 104. The heat conducted from ambient water through the wall of the pipe section 222 into its bore 223 prevents such freeze-up. If additional heat flow is needed, depending upon the temperature of the ambient water and the amount of expansion chilling which is occurring, then metal heat-conducting fins can be welded onto the pipe section 222 for increasing the surface area available for heat transfer.

By virtue of the fact that the vent port 102 is open, the ambient water flow 190 (FIG. 7) which returns 192 (FIG. 7) the water piston 128A (FIG. 13) to its initial position (FIG. 13) can fill 181 (FIG. 7) the vent line 104. As seen in FIG. 13, there are water re-entry ports 142 in the wall of the exterior cylinder 68 which communicate with an annular re-entry passage 119 formed by a cylindrical band 226 welded around the exterior cylinder 68, which in turn communicates with other re-entry ports 143 feeding into the head space 180 above the water piston 128A. There are stops 228 which prevent the piston head 132A of the water piston 128A from coming into contact with the special clamp ring 24A. Thus, there is clearance in the head space 180 for water re-entry flow automatically to occur from the water cylinder space 78 through ports 142, through annular passage 119, through ports 143, through head space 180, and through vent port 102, through pipe 222 and through the hose line 104, thereby filling the vent line 104 with water.

I have found that the inertia of this water itself in the vent line 104 may advantageously be used to eliminate the need for the vent valve 98 described in the earlier embodiments of the hydro gun. More specifically, the inertia of this lengthy mass of the water extending up about thirty feet through the vent line is itself sufficient to momentarily prevent any significant escape of high pressure air through the vent line immediately while the hydro gun is fired. As the hydro gun is fired, high pressurized air is discharged 150, 152 (FIG. 5) from the firing chamber 20. As explained above, this discharged pressurized air is directed downwardly by the sloping surface 118 of the special clamp ring 24A to rapidly propel the annular water piston 128A downwardly to rapidly propel water from the annular cylinder space 78 out through the water discharge ports 74. The presence of the mass of water filling the vent line 104 provides inertia sufficient momentarily to prevent significant venting of the high pressure air immediately after firing, which advantageously delays significant venting of pressurized air through the vent line 104 to retain the discharged pressurized air within the upper portion 180 of the cylinder space 78 for a brief time sufficient to complete the full expulsion stroke 154 (FIG. 5) of the water piston 128A and to allow the airgun shuttle 16 to return to its initial closed position before venting occurs.

Therefore, the presence of water filling the vent line 104 during firing, in itself, can be used to perform the function of a closed valve, thereby rendering the vent valve 98 unnecessary for successful operation of the hydro gun. This elimination of the vent valve 98 and its associated pressure control system components 56, 114, etc., advantageously reduces the complexity of the hydro gun and therefore increases overall reliability.

This embodiment of FIGS. 11-13 includes a number of interesting modifications. The firing piston 38 includes a peripheral skirt 230 which internally covers the inner axially elongated discharge ports 172 which are adjacent to the main discharge ports 34. Thus, this firing piston skirt 230 prevents water from entering the interior of the liner 32 of the central housing 14. Consequently, when the shuttle 16 moves during its firing stroke, there is no water in front of the firing piston to be expelled through the discharge ports 172-34.

Contrarywise, in FIGS. 3, 8 or 9 the ambient water upon entering the head space 180 can enter through the discharge ports 34 (or 34-172) and fill the liner 28 (or 168). Thus, this water is located in front of the firing piston 38 and is expelled through the discharge ports 34 or 34-172 as the shuttle is travelling in its firing stroke.

The one-piece water piston 128A is constructed with even less mass than the water piston 128 in FIGS. 8 and 9 for augmenting the speed and force with which water is expelled by the piston 128A through the ports 74. Its piston head 132A has a relatively thin top wall 232 comparable with its cylindrical side wall 130. A skirt 234 extends down from the perimeter of this thin top wall 232. Both bearing rings 94 and the o-ring 97 or other type of seal are carried in a single shallow groove which encircles the skirt 234 of the piston, head 132A. The o-ring 97 is sandwiched between the two bearing rings 94 for augmenting the sealing action even though the bearing rings 94 are relatively thin in their radial dimension. Also, as seen in FIG. 12, its lowermost flared flange piston 138A is thinner and less massive than the flared flange piston 138 in FIGS. 8 and 9. Moreover, instead of a single bearing ring 140 (FIGS. 8 and 9), the piston 138A has a pair of bearing rings 140 with an o-ring seal 97 or other type of seal sandwiched between them, carried in a relatively shallow groove within the lower piston flange 138A of the water piston 128A.

The firing chamber 20 has a housing 154A which is modified from the firing chamber housing 154 in FIG. 9. This newer housing 154A has a clamp ring mounting groove 236 instead of a mounting flange 158 (FIG. 9), and the exterior cylinder 68 is secured to the firing chamber housing 154" by the clamp ring 218 instead of by bolts 164 and an inner rim 162.

A locating pin 238 (FIG. 12) orients the exterior cylinder 68 with respect to the clamp ring 218 for orienting the water discharge ports 74 horizontally for reasons to be explained later. The very end of the exterior cylinder 68 seats within a rim lip 240 on the clamp ring 218. The exterior surface 61 of the firing chamber housing 154A forms the inner cylindrical surface of the annular water cylinder chamber 78 on which slides the piston ring 140 plus the o-ring 97.

By virtue of using these two bearing rings 140 with an o-ring or other seal sandwiched between them within the flared piston flange 138A, the two stationary piston rings 76 (FIG. 9) are eliminated. Thus, both ends of the water piston 128A carry two bearing rings with an o-ring between them; namely, the two outer rings 94 plus o-ring 97 (FIG. 13) and the two inner rings 140 plus o-ring or other seal 97 (FIG. 12).

As explained previously, four water discharge ports 74 appeared to be optimum. Previously, I explained that my experiments showed that two diametrically opposed ports were apparently too few for optimum results to be obtained.

Further experiments have now shown that orienting the two diametrically opposed water discharge ports 74 facing outwardly horizontally on opposite sides of the hydro gun, as shown in FIGS. 11 and 12, produce a cavitation implosion of increased power. Therefore, at this time, two opposed horizontally facing water discharge ports 74 is my presently preferred optimum arrangement. The locating pin 238 serves to orient the two water ports 74 horizontally with respect to the upwardly extending towing gear 216, 214.

My theory for explaining this optimum horizontal orientation of the water ports 74 is that the ambient water pressure near opposite sides of the hydro gun at the same depth below the surface of the body of water is the same. Therefore, the cavitation implosions produced by the two large slugs of water ejected through the ports 74 (FIGS. 11 and 12) occur simultaneously, thus their pressure pulse peaks occur simultaneously, and these simultaneous pressure peaks are directly additive in their far field seismic signal pressure peak strength. The far field seismic signal occurs (as a rough rule of thumb) at a distance below the hydro gun which is equal to or greater than approximately ten wavelengths at the frequency involved.

My theory is that, if one water port faces vertically upwardly and the other faces vertically downwardly, then the lower cavitation implosion occurs prior to the upper cavitation implosion, because the ambient water pressure below the hydro gun is greater than that above. Therefore, the two pressure peaks do not occur simultaneously, and consequently they are not additive in the resultant far field peak strength of the seismic signal.

Regardless of whether or not the above theory is correct, the optimum pulse peak strength of the far field seismic signal occurs with the two water discharge said movable sliding seal being carried by the water piston for sliding along the inner wall surface of said exterior cylindrical housing;

said annular water piston has an inwardly-facing cylinderical surface on its inner circumference; and there is at least one stationary sliding seal mounted in stationary position relative to the air gun and sliding along said inwardly-facing cylindrical surface of the water piston.

10. Apparatus for as claimed in claim 9, in which:

vent means are including communicating with a region of lower pressure than ambient water pressure for venting air from said annular chamber after said annular piston has completed its water-expelling stroke by moving to a second position and after the gas discharge ports have been closed for causing ambient water pressure automatically to return the annular piston from its second to its first position;

said annular piston has at least one water re-entry passage therein for allowing water to flow through said reentry passage into a head space of said annular chamber located near said gas discharge ports for re-filling said head space with water after the annular piston has returned to its first position; and said water re-entry passage is located in said annular piston near said statioary sliding seal when the annular piston is in its first position for causing the reentry passage to move past said stationary sliding seal during the water-expelling stroke of the annular piston for preventing escape of discharged pressurized air from the annular chamber through the water re-entry passage until after the discharge ports have been closed for conserving pressurized air within the air gun.

11. Apparatus for converting an air gun into a hydro gun as claimed in claim 10, in which:

the air gun has an annular region of reduced outside diameter associated therewith positioned in alignment with said water re-entry passage when the annular piston is in its first position thereby providing clearance for re-filling of the head space by water flowing through said re-entry passage and clearance after the annular piston has returned to its first position.

12. Apparatus as claimed in claim 2, wherein said air gun firing means communicates directly with a firing passage in the air gun, in which:

an adapter member is mounted between said firing means and said firing passage; and said adapter member defineds a control passage in operative relationship between said firing passage and said relief valve for automatically closing said relief valve before the air gun fires.

13. Apparatus as claimed in claim 12, in which:

said relief valve includes a spring urging a valve element to an open position; and said control passage allows pressurized air to flow from said firing passage to said valve element for applying force on said valve element in opposition to said spring for causing the pressurized air to automatically close said valve element when the firing passage has pressurized air therein.

14. Apparatus as claimed in claim 13, wherein the air gun has a small bleed passage leading to the ambient water and communicating with the firing passage for preventing inadvertent accumulation of pressurized air in the firing passage for preventing inadvertent firing of the air gun, in which:

said small bleed passage is used to bleed pressurized air from said control passage through said firing passage for reducing the force on said valve element in opposition to said spring for allowing said spring automatically to re-open said valve element.

15. Apparatus as claimed in claim 14, in which:

said valve element and said spring are proportioned for causing the pressurized air in said control passage to hold the valve element closed until after the annular water piston has completed expelling water through said water discharge ports.

16. Apparatus for converting into a hydro gun a submersible seismic source air gun of the type which includes (I) a substantially cylindrical composite body including an end housing defining an operating chamber, a further housing having gas discharge ports through its outer wall and a firing chamber, (II) a movable member for axial travel between a first position blocking fluid flow between said firing chamber and said gas discharge ports and a second position permitting such flow, (III) means for admitting pressurized air into said firing chamber, and (IV) firing valve means for causing said member to move suddenly from said first position to said second position for suddenly discharging pressurized air from said firing chamber through said gas discharge ports, comprising:

means for securing said end housing to said further housing including annular fastening means encircling said cylindrical body and extending outwardly therefrom;

an exterior cylinder extending from said annular fastening means coaxial with, and spaced from, said air gun and defining at least one water port near the end remote from said annular fastening means; and an annular piston slidable within the annular space between the air gun and the exterior along a stroke from a position near said fastening means toward said water port, under the propelling influence of pressurized air discharged from said gas discharge ports to expel water through said water port.

17. Apparatus for converting an air gun into a hydro gun as claimed in claim 16 wherein, said annular space is closed by an end wall located at the lower end of said exterior cylinder;

said exterior cylinder has a plurality of water ports located circumferentially therein and being spaced upwardly from said end wall for defining a piston damping volume between said ports and end wall; and the lower end of said annular piston is shaped for entry into said damping volume as the annular piston nears a limit of its water-expelling stroke for damping the ripid motion of said piston.

18. Apparatus for converting an air gun into a hydro gun as claimed in claim 16, in which:

a firing chamber is used with the air gun having an outwardly-facing cylindrical surface;

said annular piston carries at least one outwardly-facing piston ring on the end thereof which is nearer said gas discharge ports, said outwardly-facing piston ring being in sliding contact with the inner surface of the exterior cylinder; and said annular piston carries at least one inwardly-facing piston ring on the end thereof which is nearer said water port, said inwardly-facing piston ring being in sliding contact with the outwardly-facing cylindrical surface of said firing chamber.

19. Apparatus for converting an air gun into a hydro gun as claimed in claim 16, in which:
- a firing chamber is used with the air gun having an outwardly-facing cylindrical surface;
- said annular piston carries a plurality of outwardly facing rings on the end which is nearer said gas discharge ports, said rings being in sliding contact with the inner surface of the exterior cylinder;
- a resilient seal between two of said rings also in sliding contact with said inner surface;
- said annular piston also carries a plurality of inwardly-facing rings on the other end thereof which is nearer said water port, said inwardly-facing rings being in sliding contact with said outwardly facing surface of the firing chamber; and
- a resilient seal between two of said inwardly-facing rings and also in sliding contact with said outwardly-facing surface.

20. Apparatus for converting an air gun into a hydro gun as claimed in claim 16 further comprising:
- a bearing sleeve mounted against the air gun for providing an outwardly-facing cylindrical surface,
- said outwardly-facing cylindrical surface together with said exterior cylinder serving to define the annular space enclosing said annular piston; and
- said annular space extending beyond the end of said air gun.

21. Apparatus for converting an air gun into a hydro gun as claimed in claim 20, in which:
- said annular piston has an inwardly-facing cylindrical surface on its inner circumference; and
- said bearing sleeve carries circumferential stationary piston rings in sliding sealing engagement with said inwardlyfacing cylindrical surface of said annular piston.

22. Apparatus for converting an air gun into a hydro gun as claimed in claim 16, including:
- a substitute firing chamber for replacing the firing chamber previously used in the air gun;
- said substitute firing chamber having an outwardly-facing cylindrical surface;
- said outwardly-facing cylindrical surface on said firing chamber cooperating with said exterior cylinder for defining said annular space in which said annular piston is slidable.

23. Apparatus for converting an air gun into a hydro gun as claimed in claim 22, in which:
- said annular piston has an inwardly-facing cylindrical surface on its inner circumference; and
- said substitute firing chamber carries circumferential stationary sliding sealing means in sliding sealing engagement with said inwardly-facing cylindrical surface of said annular piston.

24. Apparatus for converting an air gun into a hydro gun as claimed in claim 23, further comprising:
- vent means communicating with a region of reduced pressure relative to ambient water pressure and communicatable with said annular space for venting air from said annular space after said annular piston has moved along its water expelling stroke and after said movable member of the air gun has returned to its first position blocking fluid flow from the firing chamber for causing ambient water pressure automatically to return the annular piston to its initial position adjacent said fastening means;
- said annular piston having at least one water reentry passage opening inwardly through its inwardly-facing cylindrical surface for allowing water to flow through said reentry passage and into the annular space near said discharge ports for filling the annular space near said discharge ports after the annular piston has returned to said initial position; and
- said water re-entry passage opening inwardly near said stationary sliding sealing means on the side thereof toward said fastening means for causing said re-entry passage to move past said stationary sliding sealing means during the water-expelling stroke of the annular piston for preventing escape of discharged pressurized air from said annular space through said re-entry passage until after said movable member of the air gun has blocked said firing chamber for conserving pressurized air in the firing chamber.

25. Apparatus for converting an air gun into a hydro gun as claimed in claim 22, in which:
- a replacement clamping ring is used to secure the substitute firing chamber to the central housing;
- said replacement ring has an annular configuration and extends to a location near said gas discharge ports; and
- said replacement clamping ring encircles said central housing filling a region between the exterior of said central housing and an interior portion of said annular piston for minimizing the available volume into which can expand the pressurized air blasting through said gas discharge ports for maximizing the thrust of the discharged pressurized air on said annular piston.

26. Apparatus for converting an air gun into a water gun as claimed in claim 22, in which:
- said substitute firing chamber has external mounting means located on the end remote from said fastening means; and
- the end of said exterior cylinder remote from said fastening means is attached onto said external mounting means.

27. Apparatus for converting an air gun into a hydro gun as claimed in claim 26, in which:
- said water port is spaced in an axial direction from the end of said annular space for forming a damping volume located beteen said water port and the end of said annular space remote from said fastening means;
- said exterior cylinder has a portion which slopes inwardly in a direction from said water port toward said remote end of the annular space; and
- the end of said piston piston remote from said gas discharge ports moves into said damping volume near the inwardly sloping portion of said exterior cylinder as the piston nears the end of its water-expelling stroke for damping the rapid travel of the piston.

28. Apparatus for converting into a hydro gun, a submersible air gun of the type which includes (I) a substantially cylindrical composite body including a first end housing defining an operating chamber, a central housing defining a shuttle chamber having gas discharge ports through its outer wall, and a second end housing defining a firing chamber, (II) a shuttle including a first piston slidably mounted in said operated chamber for axial travel between a charging position and a firing position, a second piston slidably mounted in said shuttle chamber for axial travel between a charging position blocking fluid flow between said firing chamber and said gas discharge ports and a firing position permitting such flow, and shaft means interconnecting said first and second piston and defining a passage therethrough, (III) means for admitting pressurized gas into said operating chamber, and (IV) firing valve means for unseating said first piston for causing said shuttle to move suddenly from said charging position to said firing position, comprising:

a clamping ring for securing said first end housing to said central housing including an annular shelf member encircling said cylindrical body and extending outwardly therefrom;

an exterior cylinder mountable on said air gun to extend away from said annular shelf member axial with, and spaced from, said second end housing and defining at least one water port adjacent an end remote from said shelf member; and an annular piston positionable within the space defined by the second end housing and the exterior cylinder to move from a position adjacent said shelf member toward said water port under an influence of pressurized gas expelled from said gas outlet ports to expel water through said water port.

29. Apparatus for converting into a hydro gun a submersible air gun, as claimed in claim 28, further including:

a cylindrical sleeve insertable into said shuttle chamber having gas discharge ports communicating with the gas discharge ports through the outer wall of the central housing and extending for a greater axial distance than the latter ports for altering the rate and length of time for the expelling of pressurized air through said gas discharge ports through the outer wall of the central housing and altering the rate and length of time for expelling of water from the hydro gun.

30. The apparatus for converting into a hydro gun an air gun as claimed in claim 28, wherein said firing valve establishes an air passage between said operating chamber and said first piston for unseating said first piston to fire said air gun, said apparatus further comprising:

a vent valve mounted on said clamping ring in communication with said gas discharge parts; and vent valve control means establishing a control flow channel between said firing valve and said vent valve for automatically closing said vent valve before the firing of said air gun.

31. The apparatus for converting into a hydro gun an air gun as claimed in claim 30 wherein:

said vent valve is normally biased open; and said control flow channel allows pressurized gas to flow through said control channel to said vent valve when the firing valve is actuated for pushing said vent valve in opposition to its bias for closing said vent valve before the pressurized gas is discharged by the air gun through said gas discharge ports.

32. The apparatus for converting into a hydro gun an air gun as claimed in claim 28, including:

a second clamping ring for securing said second end housing to said central housing;

said second ring being annular in configuration and extending to a location near said gas discharge ports; and said second ring encircling said central housing for substantially filling a region between the exterior surface of said central housing and an interior portion of said annular piston for minimizing the available volume into which can expand the pressurized gas discharged through said gas discharge ports for maximizing the thrust of the discharged pressurized gas on said annular piston.

33. The apparatus for converting into a hydro gun an air gun as claimed in claim 32, in which:

said annular piston has a head end surface near said discharge ports sloping outwardly in a direction toward said shelf member for causing the discharged expanding pressurized gas to forcefully propel the annular piston away from said shelf member.

34. A system for converting an air gun having at least one pressurized air discharge port into a hydro gun comprising:

inner cylinder means defining an outwardly-facing cylindrical surface;

outer cylinder means radially spaced from said inner cylinder means for defining an annular cylinder space between said outer and inner cylinder means;

head means defining a head for said annular cylinder space;

said inner and outer cylinder means and said head means being adapted to be mounted with the air gun with the head end of said annular cylinder space in communication with the pressurized air discharge port;

the opposite end of said cylinder space from the head end being adapted to allow water to enter and leave said opposite end;

annular piston means slidable within said annular cylinder space away from and toward the head means for suddenly expelling water from said opposite end when pressurized air is discharged through said discharge port during firing of the air gun; and vent means in communication with said head end of the annular cylinder space and also in communication with a region of lower pressure than ambient water pressure for allowing ambient water pressure to push the annular piston back to its initial position near said head means.

35. A system for converting an air gun into a hydro gun as claimed in claim 34, in which:

said vent means includes a differential area valve and bias means normally urging said valve toward its open condition; and said differential area valve is adapted to be placed in communication with a region of the air gun in which the pressure rises before the air gun fires for causing said valve to close automatically prior to firing and to remain closed during firing and thereafter to re-open for venting the expanded discharged pressurized air for causing ambient water pressure automatically to push the annular piston back to said initial position.

36. An annular water piston for use in an annular water cylinder space of a hydro gun encircling an air gun, said annular water piston comprising:

an elongated, thin-walled hollow circular cylindrical member having an axis and being adapted to encircle an air gun and having upper and lower flanges extends generally radially outwardly from said circular cylindrical member;

said upper flange forming an annular piston head and having an outer peripheral skirt portion extending from said upper flange toward said flange and having at least one exterior circumferential groove extending in said outer peripheral skirt portion for carrying a ring for sliding in sealing relationship along an inwardly facing circular cylindrical surface of an outer housing of a hydro gun encircling the air and forming an exterior inwardly facing surface of an annular water cylinder space encircling the air gun;

said annular water piston being mountable in an annular water cylinder space encircling an air gun for free movement in a direction along its axis in said annular water cylinder space; and said annular water piston being suddenly movable in a water-expulsion stroke in an axial direction in said annular water cylinder space by discharge of pressurized gas from the air gun into said annular water cylinder space near said annular piston head.

37. An annular water piston as claimed in claim 36, in which:

said thin-walled hollow circular cylindrical member has an inner circular cylindrical surface for sliding in sealing relationship over at least one stationary ring encircling the air gun.

38. An annular water piston as claimed in claim 36, in which:

said lower flange of said annular water piston has at least one interior circumferential groove for carrying a ring for sliding along the exterior outwardly facing circular cylindrical surface of a housing of an air gun encircled by said annular water piston.

39. An annular piston claimed in claim 36, in which:

said annular piston has at least one water re-entry port therein opening inwardly through said inner cylindrical surface.

40. Apparatus for use in converting an air gun into a hydro gun for marine seismic surveying in a body of water, the air gun being of the type which is generally cylindrical in overall configuration about a longitudinal axis and includes an axially extending composite body including a first housing defining an operating chamber and a second housing adjacent to said first housing and having at least one discharge port through which is discharged a blast of pressurized air upon firing of the air gun, said first housing having a first flange and said second housing having a second flange abutting said first flange, said flanges being concentric about said axis, said apparatus comprising:

clamp ring structure having an internal recess adapted to be positioned concentric about said axis for encircling said first and second abutting flanges of said first and second housings for securing said first and second housings together;

said clamp ring structure having an exterior mounting surface adapted to be positioned concentric about said axis, said exterior mounting surface being located on said clamp ring structure further from said axis than said internal recess and serving for supporting outer cylinder for encircling at least said second housing for separing the discharge port from the ambient water for confining the discharged air blast within said outer cylinder; and said clamp ring structure having vent means therein located intermediate said internal recess and said exterior mounting surface for being in communication with the space within said outer cylinder near said ring structure for venting the expanded air blast from said space subsequent to firing of the air gun;

said vent means bieng adapted for communicating with a region of lower pressure than the ambient water pressure for venting the expanded air blast to said region of lower pressure.

41. Apparatus for use in converting an air gun into a hydro gun for marine seismic surveying as claimed in claim 40, in which:

said vent mean includes a differential area valve and bias means normally urging said valve into its open condition; and said apparatus includes adapter means for mounting on said first housing of the air gun for providing communication from (i) a region in the air gun in which the pressure rises just before the air fires to (ii) said differential area valve for causing said valve to close automatically prior to firing of the air gun and to remain closed during firing and thereafter to re-open for venting the expanded air blast from said spaced within the outer cylinder.

42. Apparatus for use in converting an air gun into a hydro gun for marine seismic surveying as claimed in claim 40, wherein the composite body of the air gun includes a third housing mounted adjacent to aid second housing; said apparatus further including:

a second clamp ring structure for encircling portions of said first and second housings for securing said third housing to said second housing; and said second clamp ring structure closely encircling said second housing immediately adjacent to said discharge port; and said second clamp ring structure terminating at said discharge port without covering said port.

43. Apparatus for use in converting an air gun into a hydro gun for marine seismic surveying, the air gun being of the type in which a removable firing chamber is removably fastened onto the main housing of the air gun, said apparatus comprising:

a firing chamber adapted to be substituted for a regular firing chamber of the air gun by fastening said firing chamber onto the main housing of the air gun;

said firing chamber having an external circular cylindrical surface prepared thereon to serve as a sliding surface for sliding engagement by an annular water-expelling piston encircling said firing chamber.

44. Apparatus for use in converting an air gun into a hydro gun as claimed in claim 43, in which:

said firing chamber has a cylindrical skirt extending therefrom; and said circular cylindrical skirt has an external cylindrical surface prepared thereon to serve as an elongation of said sliding surface for enabling said annular piston to have a relatively long stroke along said sliding surface.

45. Apparatus for use in converting an air gun into a hydro gun as claimed in claim 44, in which:

the end of said cylindrical skirt remote from the main housing includes means for fastening an outer cylinder housing onto said skirt, said outer cylinder housing being radially spaced from said sliding surface for defining an annular cylinder space between said outer housing and said sliding surface.

46. Apparatus for use in converting an air gun into a hydro gun as claimed in claim 43, in which:

said firing chamber has at least one external circumferential groove formed in its exterior near said sliding surface for mounting a stationary ring in said groove for sliding engagement with the inner surface of said annular water-expelling piston.

47. Apparatus for use in converting an air gun into a hydro gun as claimed in claim 46, in which:

said firing chamber has an exterior surface of reduced outside diameter above said stationary ring for facilitating the re-entry flow of water passing through a port in said annular piston alignable with said reduced outside diameter surface.

48. For use in a seismic source marine air gun of the type which includes a housing defining a shuttle chamber having rectangular discharge ports through its wall, a firing chamber, and a shuttle slidably mounted in said shuttle chamber for axial travel between an initial position in which said firing chamber is closed and a firing position in which said firing chamber is open to said discharge ports for releasing a blast of pressurized air from said firing chamber out through said ports:

a liner sleeve insertable into said shuttle chamber to be inserted when the air gun is converted into a hydro gun, said liner sleeve having discharge ports extending radially through said liner sleeve and being positioned in said liner sleeve for directly communicating with said rectangular discharge ports in the housing wall, and said discharge ports having a greater length in the direction of motion of the shuttle than said rectangular ports and having a smaller average width than said rectangular ports.

49. For use in a seismic source marine air gun, a liner sleeve as claimed in claim 48, in which:

said inner discharge ports in said liner sleeve have an elongated triangular configuration with the apex of each triangle positioned near to siad initial position.

* * * * *